(12) United States Patent
Noda et al.

(10) Patent No.: US 9,966,191 B2
(45) Date of Patent: May 8, 2018

(54) MULTILAYER ELECTRONIC COMPONENT

(71) Applicant: TDK CORPORATION, Tokyo (JP)

(72) Inventors: Yohei Noda, Tokyo (JP); Hirobumi Tanaka, Tokyo (JP); Keisuke Okai, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days. days.

(21) Appl. No.: 15/265,449

(22) Filed: Sep. 14, 2016

(65) Prior Publication Data

US 2017/0076868 A1 Mar. 16, 2017

(30) Foreign Application Priority Data

Sep. 15, 2015 (JP) .................................. 2015-182055

(51) Int. Cl.
| | |
|---|---|
| *H01G 4/30* | (2006.01) |
| *C03C 3/085* | (2006.01) |
| *C03C 3/062* | (2006.01) |
| *C03C 3/091* | (2006.01) |
| *C03C 3/087* | (2006.01) |
| *C03C 3/064* | (2006.01) |
| *C03C 4/16* | (2006.01) |
| *C03C 3/089* | (2006.01) |
| *C03C 10/00* | (2006.01) |

(Continued)

(52) U.S. Cl.
CPC .............. *H01G 4/30* (2013.01); *C03C 3/062* (2013.01); *C03C 3/064* (2013.01); *C03C 3/085* (2013.01); *C03C 3/087* (2013.01); *C03C 3/089* (2013.01); *C03C 3/091* (2013.01); *C03C 4/16* (2013.01); *C03C 10/0009* (2013.01); *H01G 4/224* (2013.01); *H01G 4/232* (2013.01); *H01G 4/2325* (2013.01); *H01G 4/12* (2013.01)

(58) Field of Classification Search
None
See application file for complete search history.

(56) References Cited

U.S. PATENT DOCUMENTS

| | | | |
|---|---|---|---|
| 4,347,650 A | | 9/1982 | Mc Larney et al. |
| 4,658,328 A | * | 4/1987 | Sakabe .................. H01G 4/232 361/309 |

(Continued)

FOREIGN PATENT DOCUMENTS

| | | |
|---|---|---|
| JP | H02-30570 B2 | 7/1990 |
| JP | H03-82006 A | 4/1991 |

(Continued)

*Primary Examiner* — Dion R Ferguson
(74) *Attorney, Agent, or Firm* — Oliff PLC

(57) ABSTRACT

A multilayer electronic component includes an element body having an internal electrode layer and a dielectric layer. These are substantially parallel to a plane including a first axis and a second axis and are alternately laminated along a third axis direction. Side surfaces facing each other in the first axis direction are respectively equipped with an insulating layer. End surfaces facing each other in the second axis direction are respectively equipped with an external electrode. The insulating layer includes a glass component. A formula (1) of $0.25 < \alpha/\beta < 1$ is satisfied, where $\alpha$ denotes a thermal expansion coefficient of the insulating layer, and $\beta$ denotes a thermal expansion coefficient of one of the internal electrode layer and the dielectric layer that is larger than a thermal expansion coefficient of the other layer.

12 Claims, 8 Drawing Sheets

(51) Int. Cl.
*H01G 4/224* (2006.01)
*H01G 4/232* (2006.01)
*H01G 4/12* (2006.01)

(56) References Cited

U.S. PATENT DOCUMENTS

| | | | |
|---|---|---|---|
| 2010/0085682 A1* | 4/2010 | Abe | H01G 4/012 361/303 |
| 2010/0165542 A1* | 7/2010 | Sohn | C03C 3/095 361/313 |
| 2013/0200749 A1* | 8/2013 | Nishisaka | H01G 4/30 310/311 |
| 2013/0201600 A1* | 8/2013 | Nishisaka | H01G 4/2325 361/301.4 |
| 2013/0208398 A1* | 8/2013 | Tanaka | H01G 4/306 361/301.4 |
| 2015/0022945 A1* | 1/2015 | Park | H01G 4/30 361/301.4 |
| 2015/0218053 A1* | 8/2015 | Kobayashi | B32B 18/00 428/212 |

FOREIGN PATENT DOCUMENTS

| | | |
|---|---|---|
| JP | H11-340083 A | 12/1999 |
| JP | H11-340089 A | 12/1999 |

* cited by examiner n – TH LAYER n+1 – TH LAYER

MULTILAYER ELECTRONIC COMPONENT

BACKGROUND OF THE INVENTION

1. Field of the Invention

The present invention relates to a multilayer electronic component.

2. Description of the Related Art

In recent years, a demand for miniaturization of electronic parts associated with the high densification of electronic circuits used in digital electronic devices such as mobile phones has increased, and the miniaturization and capacity enlargement of multilayer electronic components constituting the circuits have been rapidly advanced.

For example, a plurality of internal electrodes is arranged in a ceramic sintered body in a multilayer electronic component such as multilayer ceramic capacitor.

To increase use efficiency of electrode materials, electrostatic capacity, accuracy, or the like, Patent Document 1 proposes a multilayer ceramic capacitor having no structure of side gaps. However, this capacitor has a problem in low voltage endurance, since internal electrodes are exposed to side surfaces of a ceramic sintered body.

Patent Document 2 proposes a structure capable of increasing voltage endurance. That is, a ceramic sintered body where internal electrodes are exposed to a pair of side surfaces is obtained, and side end edges of the internal electrodes are thereafter removed by a physical method such as etching and sandblasting. Then, synthetic resin, such as epoxy resin, is injected to the removed area to form insulating layers. This is how voltage endurance is improved.

However, if glass is used for the insulating layer, adhesion between the end surfaces where the internal electrodes are exposed and the glass tends to be weak. Thus, there is a problem in generation of cracks due to stress caused by differences in thermal expansion coefficient between the ceramic sintered body and the glass.

Furthermore, Patent Document 3 proposes a method for manufacturing a ceramic sintered body coated with insulating layers whose main component is glass, which is deposited on outer surfaces of a ceramic sintered body because a ceramic component of the ceramic sintered body contains a glass component at a predetermined weight ratio.

In this method, however, a thermal expansion coefficient of the ceramic sintered body is decreased, and almost no compression stress is applied to the insulating layer due to containment of glass as ceramic component. There is thus a problem that tensile stress from the ceramic sintered body to the insulating layer generated by thermal shock cannot be reduced and cracks are easy to be generated.

Patent Document 4 discloses a method for decreasing a thermal expansion coefficient of a non-capacitance portion containing barium titanate etc. by 4 to $10 \times 10^{-7}$/K than a thermal expansion coefficient of a capacitance portion. This makes it possible to apply compression stress to the non-capacitance portion, reduce the tensile stress due to deflection, and enhance bending strength.

However, if glass is used for a non-capacitance portion, there is a problem that compression stress generated by the difference in thermal expansion coefficient is almost reduced due to low elastic modulus of glass, compression stress applied to the non-capacitance portion is not sufficient, and the effect of improving thermal shock resistance cannot be obtained.

In addition, there is a potential problem that thermal shock resistance glass is weak against tensile stress. For example, the following problem arises: If glass surface is scratched, tensile stress tends to concentrate on the scratched portion, and mechanical strength is decreased. Thus, the glass cannot bear thermal shock generated by soldering at the time of mounting, and cracks are easy to occur.

Also, there is a large problem in reliability because moisture resistance and withstand voltage may be decreased if cracks caused by stress of thermal shock are generated to not only a ceramic sintered body but also to glass of an insulating layer.

Patent Document 1: Japanese Examined Patent Publication No. H2-30570 B2
Patent Document 2: JP H3-82006 A
Patent Document 3: JP H11-340089 A
Patent Document 4: JP H11-340083 A

SUMMARY OF THE INVENTION

The present invention has been made in view of the above circumstances, and an object thereof is to provide a ceramic sintered body having high thermal shock resistance.

Means for Solving Problem

In order to achieve the above object, the ceramic sintered body of the present invention is as follows.

[1] A multilayer electronic component comprising an element body having an internal electrode layer and a dielectric layer, both of which are substantially parallel to a plane including a first axis and a second axis and are alternately laminated along a third axis direction, wherein a pair of end surfaces (side surfaces) facing each other in the first axis direction of the element body is respectively equipped with an insulating layer, a pair of end surfaces facing each other in the second axis direction of the element body is respectively equipped with an external electrode electrically connected to the internal electrode layer, the insulating layer comprises a glass component, and a formula (1) of $0.25 < \alpha/\beta < 1$ is satisfied, where $\alpha$ denotes a thermal expansion coefficient of the insulating layer and $\beta$ denotes a thermal expansion coefficient of one of the internal electrode layer and the dielectric layer that is larger than a thermal expansion coefficient of the other layer.

According to the present invention, the ceramic sintered body having high thermal shock resistance can be provided.

As a specific aspect of [1] above, the following aspects are exemplified.

[2] The multilayer electronic component according to [1], in which a reaction phase where at least one of constituents of the insulating layer is diffused in the dielectric layer is formed at an interface between the dielectric layer and the insulating layer.

[3] The multilayer electronic component according to [2], in which the reaction phase is a Ba—Ti—Si—O phase.

[4] The multilayer electronic component according to any of [1] to [3], in which the glass component constituting the insulating layer contains:
$SiO_2$ of 30 to 70 mass %;
BaO of 20 to 60 mass %; and
$Al_2O_3$ of 1 to 15 mass %, and
the glass component constituting the insulating layer contains $SiO_2$, BaO, and $Al_2O_3$ of 70 to 100 mass % in total.

[5] The multilayer electronic component according to [4], in which
the glass component constituting the insulating layer further contains:
alkali metal of 0.1 to 15 mass %;
CaO of 0 to 15 mass %;
SrO of 0 to 20 mass %; and
$B_2O_3$ of 0 to 10 mass %.

In addition, the method for manufacturing a multilayer electronic component for achieving the above object is not particularly limited, but examples thereof may include the following manufacturing method.

[6] A method for manufacturing the multilayer electronic component, the method including
a step of obtaining a green laminate by laminating a green sheet having an internal electrode pattern layer that is continuous in a first axis direction and is substantially parallel to a plane including a first axis and a second axis formed in a third axis direction,
a step of obtaining a green chip by cutting the green laminate so as to obtain a cutting plane parallel to a plane including a second axis and a third axis,
a step of obtaining an element body having an internal electrode layer and a dielectric layer alternately laminated by calcinating the green chip,
a step of obtaining a ceramic sintered body having an insulating layer formed by coating and baking a paste for insulating layer on an end surface in the first axial direction of the element body, and
a step of obtaining a multilayer electronic component where an external electrode is formed by baking a paste for external layer on an end surface in the second axial direction of the ceramic sintered body, in which
the insulating layer comprises a glass component, and
a formula (1) of $0.25<\alpha/\beta<1$ is satisfied, where
$\alpha$ denotes a thermal expansion coefficient of the insulating layer and
$\beta$ denotes a thermal expansion coefficient of one of the internal electrode layer and the dielectric layer that is larger than a thermal expansion coefficient of the other layer.

BRIEF DESCRIPTION OF THE DRAWINGS

FIG. 5Ab is a plan view illustrating a portion of the n+1-th internal electrode pattern layer.

DESCRIPTION OF THE PREFERRED EMBODIMENTS

Figure 1:
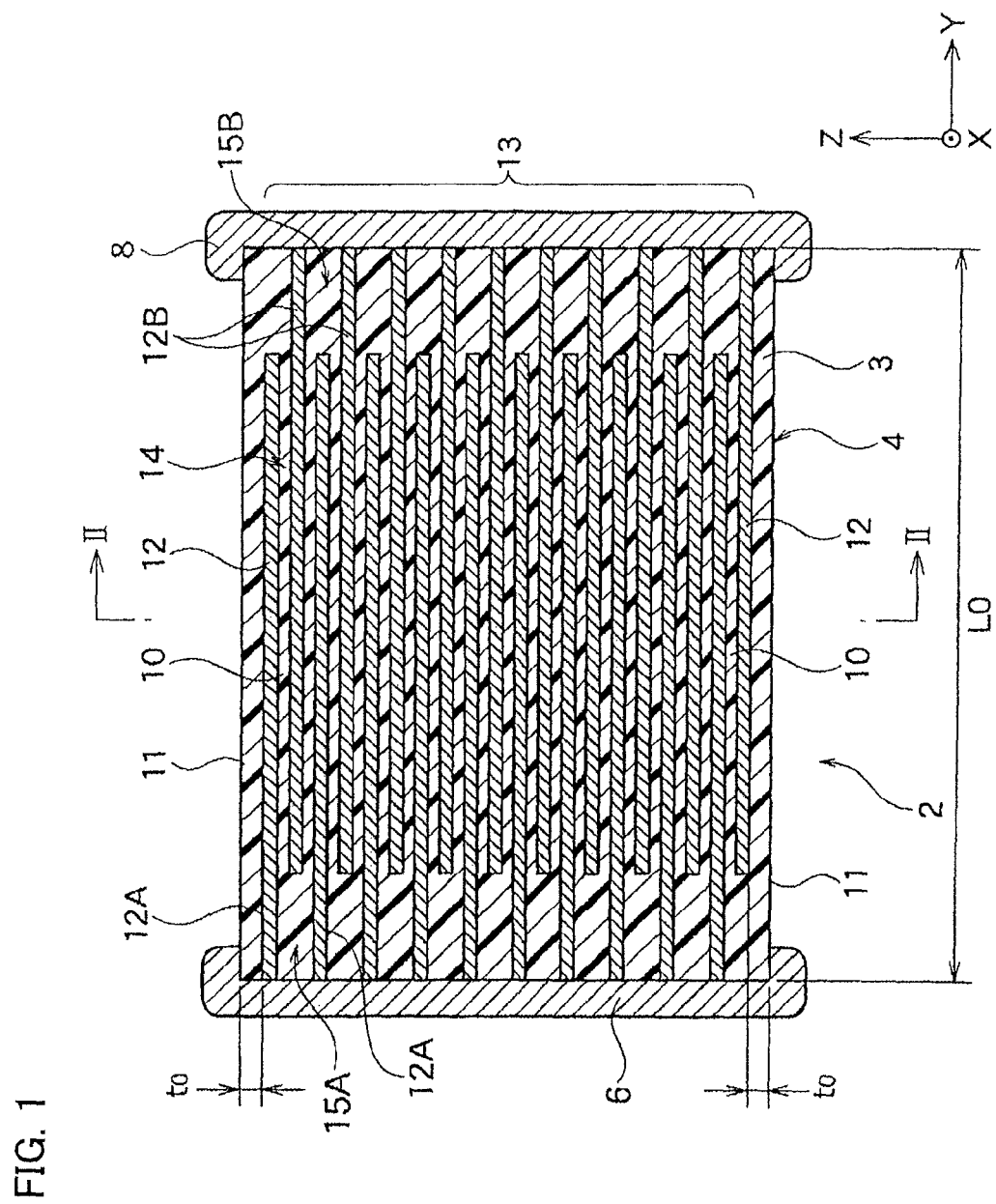
FIG. 1 is a schematic cross-sectional view of the multilayer ceramic capacitor according to an embodiment of the present invention.

The present invention will be described in detail based on the present embodiment with reference to the drawings, but the present invention is not limited to the embodiment to be described below.

In addition, the constituents to be described below include those that can be easily presumed by those skilled in the art and those that are substantially the same with one another. Furthermore, the constituents to be described below can be appropriately combined with one another.

Hereinafter, the present invention will be described based on the embodiment illustrated in the drawings.

Overall Configuration of Multilayer Ceramic Capacitor

As an embodiment of the laminated electronic component according to the present embodiment, the overall configuration of a multilayer ceramic capacitor will be described.

Figure 2:
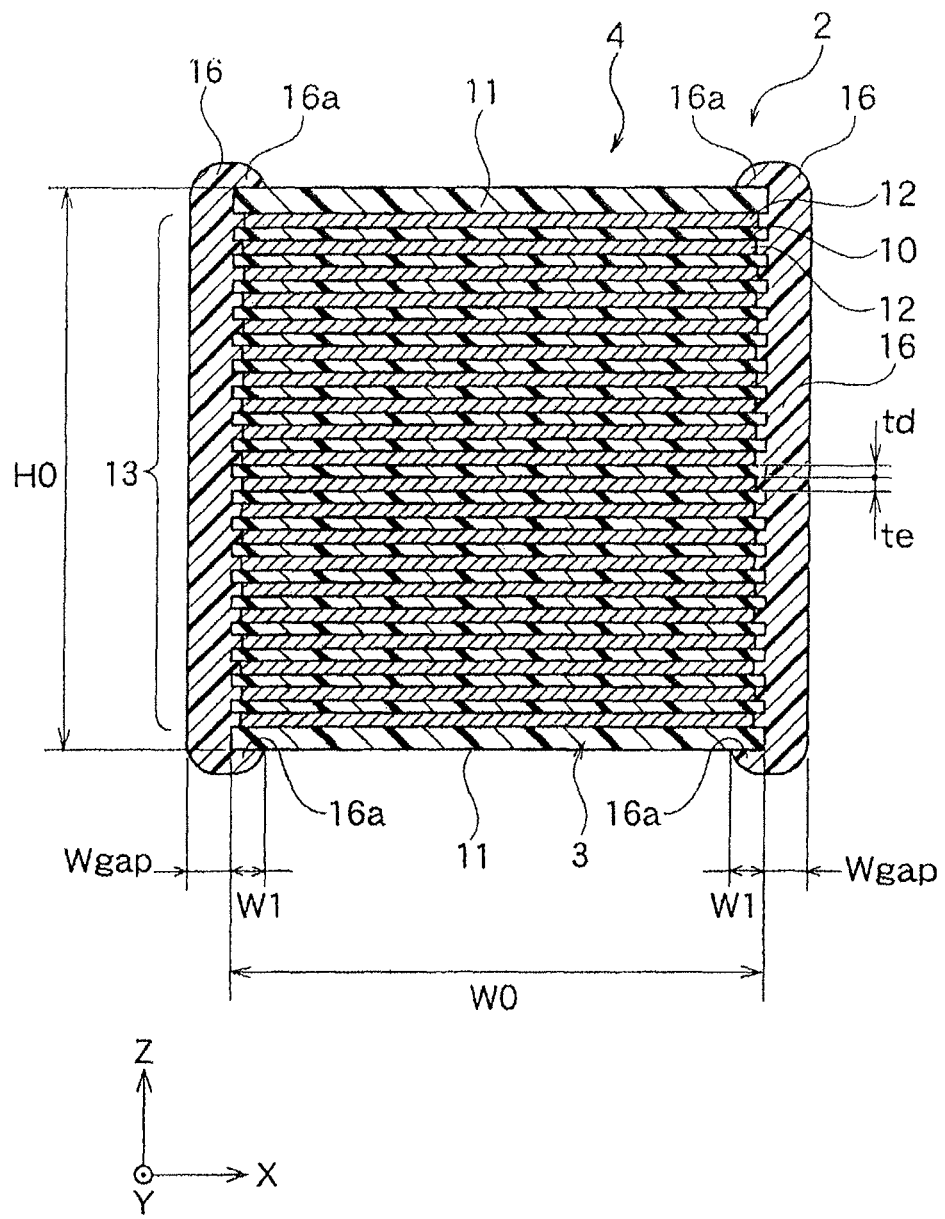
FIG. 2 is a cross-sectional view taken along the line II-II illustrated in FIG. 1.

As illustrated in FIG. 1, a multilayer ceramic capacitor 2 according to the present embodiment includes a ceramic sintered body 4, a first external electrode 6, and a second external electrode 8. In addition, as illustrated in FIG. 2, the ceramic sintered body 4 has an element body 3 and an insulating layer 16.

The element body 3 has an inner dielectric layer 10 and an internal electrode layer 12 which are substantially parallel to a plane including an X-axis and a Y-axis, and the internal electrode layer 12 is alternately laminated between the inner dielectric layers 10 along a Z-axis direction. Here, the term "substantially parallel" means that the most part is parallel but there may be a part that is not parallel, and it intends that the internal electrode layer 12 and the inner dielectric layer 10 may be a little irregular or tilted.

The portion at which the inner dielectric layer 10 and the internal electrode layer 12 are alternately laminated is an interior region 13.

In addition, the element body 3 has an exterior region 11 on both end surfaces in the laminating direction Z (Z-axis) thereof. The exterior region 11 is formed by laminating a plurality of outer dielectric layers that are thicker than the inner dielectric layer 10 constituting the interior region 13.

Incidentally, hereinafter, the "inner dielectric layer 10" and the "outer dielectric layer" are collectively referred to as the "dielectric layer" in some cases.

The material for the inner dielectric layer 10 and the dielectric layer constituting the exterior region 11 may be the same as or different from each other, and it is not particularly limited, and for example, they may be constituted to contain a dielectric material having a perovskite structure such as $ABO_3$ as a main component.

In $ABO_3$, for example, A is at least one kind such as Ca, Ba, or Sr, and B is at least one kind such as Ti or Zr. The molar ratio of A/B is not particularly limited, and it is from 0.980 to 1.020. In addition, as accessory component, rare earth (at least one kind selected from Sc, Y, La, Ce, Pr, Nd, Pm, Sm, Eu, Gd, Tb, Dy, Ho, Er, Tm, Yb, and Lu), alkali earth metal, Mg, Mn, oxide of transition metal (e.g., at least one kind selected from V, W, and Mo), its mixture, composite oxide, sintering aid, or the like may be contained.

One internal electrode layer 12 to be alternately laminated has a lead portion 12A that is electrically connected to the inner side of a first external electrode 6 formed on the outer side of a first end portion in a Y-axis direction of the ceramic sintered body 4. In addition, the other internal electrode layer 12 has a lead portion 12B that is electrically connected to the inner side of a second external electrode 8 formed on the outer side of a second end portion in a Y-axis direction of the ceramic sintered body 4.

The interior region 13 has a capacity region 14 and lead regions 15A and 15B. The capacity region 14 is a region in which the internal electrode layer 12 is laminated along the laminating direction so as to sandwich the inner dielectric layer 10. The lead region 15A is a region located between the lead portions 12A of the internal electrode layers 12 to be connected to the external electrodes 6. The lead region 15B is a region located between the lead portions 12B of the internal electrode layers 12 to be connected to the external electrodes 8.

The conductive material contained in the internal electrode layer 12 is not particularly limited, and it is possible to use a metal such as Ni, Cu, Ag, Pd, Al, or Pt and an alloy thereof. As a Ni alloy, an alloy of Ni with one or more kinds of elements selected from Mn, Cr, Co, or Al is preferable, and the Ni content in the alloy is preferably 95 wt % or more. Incidentally, various kinds of trace components such as P may be contained in Ni or a Ni alloy at about 0.1 wt % or less.

As illustrated in FIG. 2, the both end surfaces in the X-axis direction of the ceramic sintered body 4 are equipped with the insulating layers 16 covering ends of the internal electrode layers 12 of the element body 3. The insulating layers 16 are constituted by a glass component.

A formula (1) of $0.25 < \alpha/\beta < 1$ is satisfied, where $\alpha$ denotes a thermal expansion coefficient of the insulating layer 16 according to the present embodiment, and $\beta$ denotes a thermal expansion coefficient of one of the internal electrode layer 12 and the dielectric layer that is larger than a thermal expansion coefficient of the other layer.

With this, an appropriate compression stress remains in the insulating layer 16 when glass to be the insulating layer 16 is baked on the element body 3 and thereafter cooled. Tensile stress is applied at the time of thermal shock to the insulating layer 16 due to difference in thermal expansion coefficient between the element body 3 and glass constituting the insulating layer 16, but the tensile stress applied to the insulating layer 16 can be reduced due to the compression stress remained in the insulating layer 16.

With satisfaction of the formula (1) by $\alpha$ and $\beta$, strength of the insulating layer 16 can be dramatically increased, mechanical strength of the ceramic sintered body 4 can be enhanced, and thermal shock resistance can be improved. In addition, adhesion between the element body 3 and the insulating layer 16 is enhanced, and structural defects, such as cracks and peeling due to shock, deflection etc. at the time of solder mounting, are prevented. Furthermore, a highly reliable multilayer electronic component capable of preventing deterioration of moisture resistance and electric characteristics can be provided by decreasing incidence rate of cracks etc. to the insulating layer 16 or the element body 3.

When $\alpha$ and $\beta$ satisfy the above formula, structural defects, such as cracks, are hard to occur due' to no application of tensile stress to the glass of the insulating layer 16, compared with when $\alpha > \beta$ is satisfied.

When $\alpha$ and $\beta$ satisfy the above formula, the glass and the element body 3 are highly adhered, and structural defect, such as cracks and peeling due to shock, deflection etc. at the time of solder mounting, are prevented, compared with when $\alpha = \beta$ is satisfied.

When $\alpha$ and $\beta$ satisfy the above formula, the tensile stress applied to the element body 3 is small, adhesion is high, and delamination can be prevented. Also, the ceramic sintered body 4 can be strengthened.

From the above point of view, $0.35 < \alpha/\beta < 0.9$ is preferable, and $0.35 < \alpha/\beta < 0.8$ is more preferable.

A thermal expansion coefficient $\alpha$ of the insulating layer 16 is preferably $45 \times 10^{-7}$ to $110 \times 10^{-7}$/K. From the above point of view, a thermal expansion coefficient of the insulating layer 16 is more preferably $45 \times 10^{-7}$ to $102 \times 10^{-7}$/K.

A thermal expansion coefficient of the internal electrode layer 12 is preferably larger than that of the insulating layer. This makes it possible to prevent concentration of load of stress by thermal shock on interfaces due to low adhesion between the internal electrode layer 12 and the insulating layer 6, and consequently prevent cracks.

Figure 3:
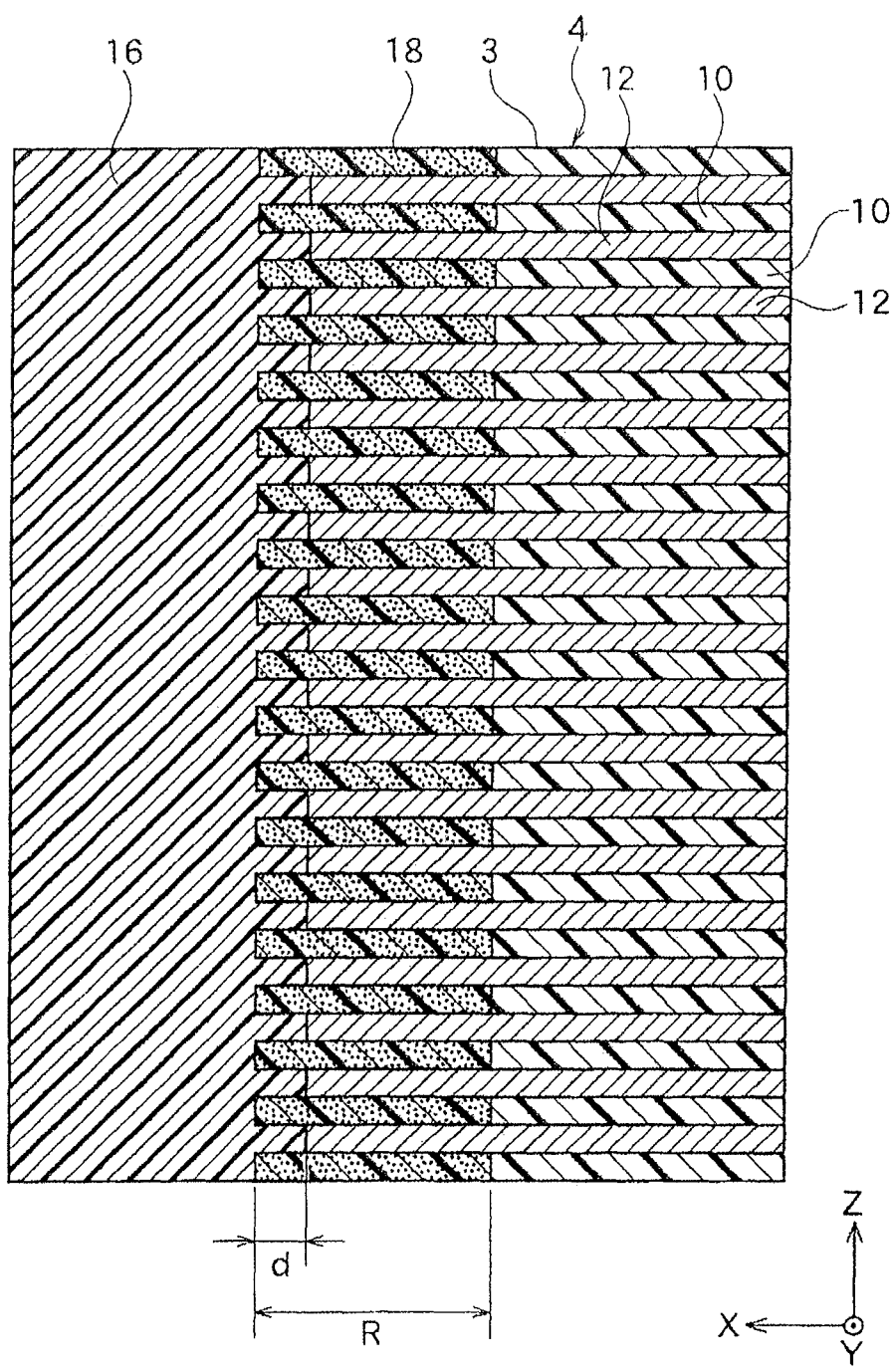
FIG. 3 is a fragmentary enlarged view of FIG. 2.

As shown in FIG. 3, the present embodiment preferably has reaction phases 18 at interfaces between the insulating layer 16 and the inner dielectric layers 10. The reaction phase is a phase where at least one of the constituents of the insulating layer is diffused in the dielectric layer. By having the reaction phase 18 at the interface between the insulating layer 16 and the inner dielectric layer 10, the side surfaces of the ceramic sintered body 4 are embedded in glass and the porosity at the interface can be suppressed to the minimum. This improves the insulating properties of the end surface of the ceramic sintered body 4 and makes it possible to improve the voltage endurance. In addition, by having a reaction phase at the interface between the insulating layer 16 and the dielectric layer, it is possible to improve the adhesive properties at the interface between the insulating layer 16 and the dielectric layer. This suppresses the delamination of the element body 3 and the insulation layer 16 and makes it possible to enhance the bending strength thereof.

Incidentally, in FIG. 3, the reaction phases 18 are formed at the end portions in the X-axis direction of each internal electrode layer 12 within the range of a predetermined depth R from the end portions in the X-axis direction of the element body 3, but the reaction phases 18 may be formed by penetrating to the insulating layer 16 side at the interfaces between the dielectric layers and the insulating layer 16. The depth R where the reaction phases 18 penetrate to the end portions in the X-axis direction of each dielectric layer can be controlled by thermal treatment time at the time of baking treatment of the insulating layer 16, for example. The depth R may be varied at each dielectric layer 10, but its average is preferably 0.01 to 10 μm, and is more preferably 0.05 μm to 5 μm. This makes it possible to improve electrostatic capacity and mechanical strength, and improve adhesion and breakdown voltage.

Incidentally, the depth R of the reaction phases 18 is not necessarily formed in a uniform manner to the width of the dielectric layers. Thus, the depth R of the reaction phases 18 is defined as a deepest length based on the interfaces of the dielectric layers and the reaction phases 18.

In the present embodiment, as shown in FIG. 3, the end portion in the X-axis direction of the internal electrode layer 12 sandwiched between the inner dielectric layers adjacent in the laminating direction (Z-axis direction) is recessed on the end surface in the X-axis direction of the element body 3, namely, at the predetermined retraction distance "d" from the X-axis direction end portion to the inner side of the dielectric layer. The retraction distance "d" may be different from each internal electrode layer 12, but its average is zero or more, for example, and is preferably 0.01 to 1 μm.

Incidentally, retraction of the ends in the X-axis direction of the internal electrode layers 3 can be removed by polishing, such as barrel polishing, the end surfaces in the X-axis direction of the element body 3 before forming the insulating layers 16. The retraction of the X-axis direction end portion of the internal electrode layer 12 is formed, for example, by the difference in sintering shrinkage factor between the material to form the internal electrode layer 12 and the material to form the inner dielectric layer 10.

The reaction phase 18 more preferably contains a Ba—Ti—Si—O phase. This makes is possible to improve adhesion between the insulating layer 16 and the side surface of the ceramic sintered body 4. From the above point of view, the Ba—Ti—Si—O phase more preferably occupies 40% to 100% of the surface area of the dielectric layers on the side surface of the ceramic sintered body 4.

When the Ba—Ti—Si—O phase contained by the reaction phase 18 is $Ba_2TiSi_2O_8$ or $BaTiSiO_2$, stress by thermal shock can be further reduced as its thermal expansion coefficient is close to that of barium titanate, and thermal shock resistance can be dramatically enhanced. Also, $Ba_2TiSi_2O_8$ or $BaTiSiO_2$ has high insulation, and thus withstand voltage can be improved. Furthermore, even if $Ba_2TiSi_2O_8$ or $BaTiSiO_2$ is present at the interface of the element body 3 and the insulating layer 16, HALT reliability is not deteriorated.

With regard to the acknowledgement of reaction phase 18, for example, the STEM-EDS analysis of the Si element at the interface between the dielectric layer and insulating layer 16 of the ceramic sintered body 4 is conducted to obtain the mapping data of the Si element, and the place at which the Si element is present is acknowledged as the reaction phase.

Furthermore, the presence of the Ba—Ti—Si—O phase containing a fresnoite phase represented by $Ba_2TiSi_2O_8$ or $BaTiSiO_5$ can be confirmed by conducting quantitative analysis of each element contained in the respective reaction phases 18 based on the STEM-EDS analysis with respect to any reaction phase 18 acknowledged in this way.

In the present embodiment, the presence of the fresnoite phase is confirmed by the above method with respect to each dielectric layer, and a ratio of the number of dielectric layers where the presence of the fresnoite phase can be confirmed to the number of dielectric layers observed is preferably 40% to 100%. This can improve mechanical strength. From the above point of view, a ratio of the number of dielectric layers where the presence of the fresnoite phase can be confirmed to the number of dielectric layers observed is more preferably 70% to 100%.

Furthermore, the presence of the Ba—Ti—Si—O phase is confirmed by the above method with respect to each dielectric layer, and a ratio of the Ba—Ti—Si—O phase in the observed reaction phase 18 of the dielectric layer is preferably 30% to 100%. This can enhance insulation of the reaction phase 18. From the above point of view, a ratio of the Ba—Ti—Si—O phase in the observed reaction phase of the dielectric layer is more preferably 50% to 100%.

A glass component constituting the insulating layer 16 is not particularly limited, but preferably contains $SiO_2$, BaO, $Al_2O_3$, alkali metal, CaO, SrO, and $B_2O_3$. This achieves plating resistance and thermal expansion coefficient suitable for side gaps while the fresnoite phase is formed at the ceramic phase of the interface between the insulating layer 16 and the ceramic element body. From the above point of view, $SiO_2$, BaO, and $Al_2O_3$ are more preferably contained.

$SiO_2$ contained as a glass component constituting the insulating layer 16 of the present embodiment is preferably contained in the glass component of the insulating layer 16 at 30 to 70 mass %. This facilitates formation of the Ba—Ti—Si—O phase at the interface between the element body 3 and the insulating layer 16.

When $SiO_2$ is contained within the above range, a sufficient amount of network former oxide is obtained and plating resistance becomes favorable, compared with when contained less than the above range.

When $SiO_2$ is contained within the above range, a softening point is prevented from being too high and operation temperature is prevented from being too high, compared with when contained less than the above range.

From the above point of view, $SiO_2$ is more preferably contained in the glass component of the insulating layer at 40 mass % to 60 mass %.

BaO contained as a glass component constituting the insulating layer 16 of the present embodiment is preferably contained in the glass component of the insulating layer 16 at 20 to 60 mass %. This facilitates formation of the Ba—Ti—Si—O phase at the interface between the element body 3 and the insulating layer 16.

When BaO is contained within the above range, adhesion with the element body 3 is favorable and delamination becomes hard to occur, compared with when contained less than the above range. Also, thermal expansion coefficient is prevented from being too small, and cracks become hard to be generated at the gap portion. Furthermore, when the dielectric layers are $BaTiO_3$, Ba is prevented from eluting to the glass component, and HALT reliability is prevented from decreasing.

When BaO is contained within the above range, vitrification becomes favorable and plating resistance becomes favorable, compared with when contained more than the above range.

From the above point of view, BaO is more preferably contained in the glass component of the insulating layer 16 at 20 mass % to 40 mass %. Incidentally, BaO has an effect of hardly decreasing reliability even if it is diffused to $BaTiO_3$.

$Al_2O_3$ contained as the glass component constituting the insulating layer 16 of the present embodiment is preferably contained in the glass component of the insulating layer 16 at 1 to 15 mass %.

When $Al_2O_3$ is contained in the above range, plating resistance becomes favorable, compared with when contained less than the above range.

When $Al_2O_3$ is contained in the above range, a softening point is prevented from increasing too high, compared with when contained more than the above range.

From the above point of view, $Al_2O_3$ is more preferably contained in the glass component of the insulating layer 16 at 3 mass % to 10 mass %.

$SiO_2$, BaO, and $Al_2O_3$ are preferably contained in the glass component constituting the insulating layer 16 of the present embodiment at 70 to 100 mass % in total. This facilitates formation of the Ba—Ti—Si—O phase at the interface between the element body 3 and the insulating layer 16. From the above point of view, $SiO_2$, BaO, and $Al_2O_3$ are more preferably contained in the glass component constituting the insulating layer 16 at 75 mass % to 95 mass % in total.

In the present embodiment, a weight ratio of $SiO_2$ and BaO contained as the glass component in the insulating layer 16 is preferably 2:1 to 2:3. This facilitates formation of $Ba_2TiSi_2O_8$ and $BaTiSiO_5$. From the above point of view, the weight ratio of $SiO_2$ and BaO is more preferably 2:1 to 1:1.

Alkali metal, CaO, SrO, and $B_2O_3$ contained as the glass component constituting the insulating layer 16 of the present embodiment do not directly affect formation of the Ba—Ti—Si—O phase at the interface of the element body 3 and the insulating layer 16, but are effective components for increasing thermal expansion coefficient of the glass and plating resistance.

The alkali metal contained as the glass component constituting the insulating layer 16 of the present embodiment includes Li, Na, and K, but more preferably includes K and Na in view of thermal expansion coefficient.

The alkali metal contained as the glass component constituting the insulating layer 16 of the present embodiment is preferably contained in the glass component of the insulating layer at 0.1 to 15 mass %. This can enhance thermal expansion coefficient.

When alkali metal is contained within the above range, plating resistance can be favorable, compared with when contained more than the above range.

From the above point of view, the alkali metal is more preferably contained in the glass component of the insulating layer 16 at 0.5 to 3 mass %.

CaO contained as the glass component constituting the insulating layer 16 of the present embodiment is preferably contained in the glass component of the insulating layer 16 at 0 to 15 mass %. This can enhance thermal expansion coefficient and make plating resistance favorable.

When CaO is contained within the above range, phase split of the glass is prevented from progressing and a uniform Ba—Ti—Si—O phase can be formed, compared with when contained more than the above range.

From the above point of view, CaO is more preferably contained in the glass component of the insulating layer 16 at 3 to 10 mass %.

SrO contained as the glass component constituting the insulating layer 16 of the present embodiment is preferably contained in the glass component of the insulating layer 16 at 0 to 20 mass %. This can enhance thermal expansion coefficient and make plating resistance favorable.

When SrO is contained within the above range, SrO can be prevented from reacting with $BaTiO_3$ and insulation and reliability of a chip can be improved, compared with contained more than the above range.

From the above point of view, SrO is more preferably contained in the glass component of the insulating layer at 0 mass % to 5 mass %.

$B_2O_3$ contained as the glass component constituting the insulating layer 16 of the present embodiment is preferably contained in the glass component of the insulating layer 16 at 0 to 10 mass %. This enables the glass to demonstrate its effect as network former oxide.

When $B_2O_3$ is contained in the above range, plating resistance can be favorable, compared with when contained more than the above range.

From the above point of view, $B_2O_3$ is more preferably contained in the glass component of the insulating layer 16 at 0 mass % to 5 mass %.

The material of the external electrodes 6 and 8 is not particularly limited either, but at least one kind of Ni, Pd, Ag, Au, Cu, Pt, Rh, Ru, Ir etc. or its alloy can be used. Cu, Cu alloy, Ni, Ni alloy, Ag, Ag—Pd alloy, In—Ga alloy, or the like is usually used.

Incidentally, in FIG. 1, the X-axis, the Y-axis, and the Z-axis are perpendicular to one another, the Z-axis coincides with the laminating direction of the inner dielectric layer 10 and the internal electrode layer 12, the Y-axis coincides with the direction in which the lead regions 15A and 15B (lead portions 12A and 12B) are formed.

The shape or size of the element body 3 may be appropriately determined in accordance with the purpose or application, but it is preferable that the width W0 in the X-axis direction is from 0.1 mm to 1.6 mm, the length L0 in the Y-axis direction is from 0.2 mm to 3.2 mm, and the height H0 in the Z-axis direction is from 0.1 mm to 1.6 mm.

According to the manufacturing method of the present embodiment to be described later, it is possible to improve the acquisition capacity as compared to that in the prior art. At this time, the effect is more remarkable when the size of the element body 3 is the size described above. From the above point of view, the size of the element body 3 of the present embodiment is preferably as follows. The width W0 in the X-axis direction is from 0.1 mm to 0.5 mm, the length L0 in the Y-axis direction is from 0.2 mm to 1.0 mm, and the height H0 in the Z-axis direction is from 0.1 mm to 0.5 mm.

In the present embodiment, as illustrated in FIG. 2, the section from the end surface in the X-axis direction of the element body 3 to the outer surface of the insulating layer 16 along the width direction (X-axis direction) of the ceramic sintered body 4 in the insulating layer 16 is adopted as the gap portion.

In the present embodiment, the width Wgap in the X-axis direction of the gap portion coincides with the dimensions from the end surface in the X-axis direction of the element body 3 to the end surface in the X-axis direction of the insulating layer 16 along the width direction (X-axis direction) of the ceramic sintered body 4, but the width Wgap is not necessarily uniform along the Z-axis direction but may be a bit varied. The width Wgap is preferably 0.5 to 30 μm, which is significantly small, compared with the width W0 of the element body 3. In the present embodiment, the width Wgap can be significantly reduced compared with a conventional one, and a retraction distance "d" shown in FIG. 3 is sufficiently small. Thus, in the present embodiment, a multilayer capacitor having small size and large capacitance can be obtained.

Incidentally, the width W0 of the element body 3 coincides with the width along the X-axis direction of the inner dielectric layer 10 including the reaction phase 18 shown in FIG. 3.

By setting Wgap to be within the above range, a decrease in electrostatic capacity is small even when the ceramic sintered body 4 is more compact as well as cracking hardly occurs.

In the present embodiment, as illustrated in FIG. 2, coated portions 16a covering end portions in the X-axis direction on both end surfaces in the Z-axis direction of the element body 3 are integrally formed with the insulating layers 16 at both ends in the Z-axis direction of the insulating layers 16. Each width W1 in the X-axis direction of the coated portions 16a from both end surfaces in the X-axis direction of the element body 3 is 0 or more, and is ½ of the width W0 at most. The width W1/W0 is preferably ¹⁄₁₀₀ to ¹⁄₁₀. When W1/W0 is in the above range, thermal shock resistance can be enhanced while maintaining high seal performance.

Incidentally, the widths Wgap of both sides in the X-axis direction of the ceramic sintered body 4 may be the same as or different from each other. The widths W1 of both sides in the X-axis direction of the ceramic sintered body 4 may be the same as or different from each other. It is preferable that the insulating layer 16 does not cover both end surfaces in the Y-axis direction of the element body 3 illustrated in FIG. 1. This is because the external electrodes 6 and 8 need to be formed on both end surfaces in the Y-axis direction of the element body 3 and need to be connected to the internal electrodes 12. The external electrodes 6 and 8 may cover part of the end portions in the Y-axis direction of the coated portions 16a, and may coat part of the end portions in the Y-axis direction of the insulating layers 16.

The ratio of the thickness "td" of the inner dielectric layer 10 to the thickness "te" of the internal electrode layers 12 is not particularly limited, and it is preferable that td/te is from 2 to 0.5. In addition, the ratio of the thickness "to" of the exterior region 11 to the height "HO" of the element body 3 is not particularly limited, and it is preferable that to/HO is from 0.01 to 0.05.

Method for Manufacturing Multilayer Ceramic Capacitor

Next, a method for manufacturing the multilayer ceramic capacitor 2 as an embodiment of the present invention will be specifically described.

First, a paste for inner green sheet and a paste for outer green sheet are prepared in order to manufacture an inner green sheet 10a to constitute the inner dielectric layer 10 illustrated in FIG. 1 after calcination and an outer green sheet 11a to constitute the outer dielectric layer illustrated in FIG. 1 after calcination.

The paste for inner green sheet and the paste for outer green sheet are usually composed of an organic solvent-based paste obtained by kneading a ceramic powder with an organic vehicle or an aqueous paste.

The raw material for the ceramic powder can be appropriately selected from various kinds of compounds to be composite oxides or oxides, for example, carbonates, nitrates, hydroxides, and organic metal compounds are used by being mixed. In the present embodiment, the raw material for the ceramic powder is used as a powder having an average particle size of 0.45 μM or less and preferably about from 0.1 to 0.3 μm. Incidentally, it is desirable to use a powder finer than the thickness of the green sheet in order to obtain a significantly thin inner green sheet.

The organic vehicle is one that is obtained by dissolving a binder in an organic solvent. The binder used in the organic vehicle is not particularly limited, and it may be appropriately selected from various kinds of common binders such as ethyl cellulose and polyvinyl butyral. The organic solvent to be used is also not particularly limited, and it may be appropriately selected from various kinds of organic solvents such as acetone and toluene.

In addition, the paste for green sheet may contain additives selected from various kinds of dispersants, plasticizers, dielectrics, accessory component compounds, glass frits, and insulating materials.

Examples of the plasticizer may include an ester of phthalic acid such as dioctyl phthalate and benzyl butyl phthalate, adipic acid, an ester of phosphoric acid, and a glycol.

Next, a paste for internal electrode layer is prepared in order to manufacture an internal electrode pattern layer 12a to constitute the internal electrode layers 12 illustrated in FIG. 1 after calcination. The paste for internal electrode layer is prepared by kneading a conductive material composed of various kinds of conductive metals or alloys described above with the organic vehicle described above.

The paste for external electrode to constitute the external electrodes 6 and 8 illustrated in FIG. 1 after calcination may be prepared in the same manner as the paste for internal electrode layer described above.

Figure 4:
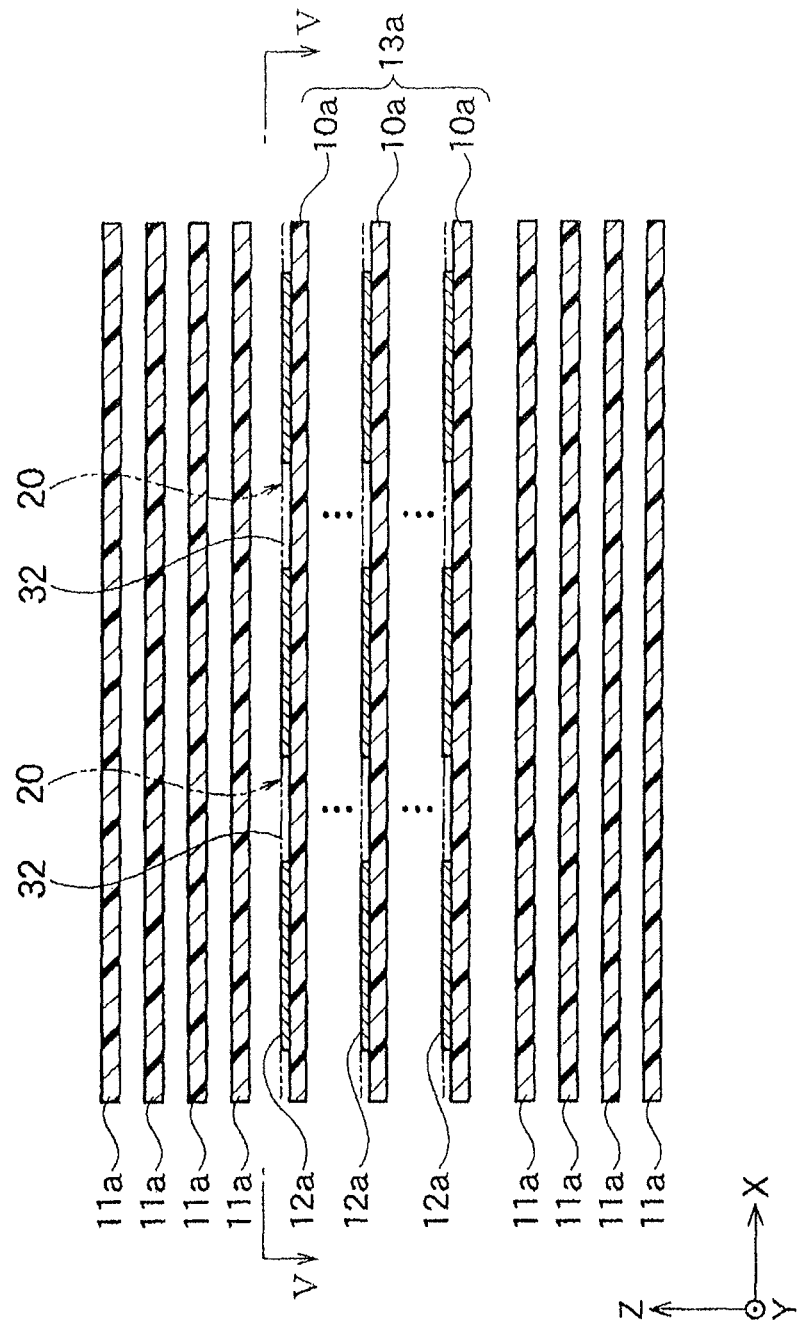
FIG. 4 is a schematic cross-sectional view illustrating the step of laminating a green sheet in the manufacturing process of a multilayer ceramic capacitor illustrated in FIG. 1.

The inner green sheet 10a and the internal electrode pattern layer 12a are alternately laminated as illustrated in FIG. 4 by using the paste for inner green sheet and the paste for internal electrode layer prepared in the above to manufacture an internal laminate 13a. In addition, after the internal laminate 13a is manufactured, the outer green sheet 11a is formed thereon by using the paste for outer green sheet, and the resultant is pressurized in the laminating direction to obtain a green laminate.

Incidentally, as a method for manufacturing the green laminate, in addition to the above, a green laminate may be obtained by alternately laminating a predetermined number of the inner green sheet 10a and the internal electrode pattern layer 12a directly on the outer green sheet 11a and pressurizing the resultant in the laminating direction.

Specifically, first, the inner green sheet 10a is formed on a carrier sheet (for example, a PET film) as a support by a doctor blade method. The inner green sheet 10a is dried after being formed on the carrier sheet.

Next, as illustrated in FIG. 4, the internal electrode pattern layer 12a is formed on the surface of the inner green sheet 10a by using the paste for internal electrode layer to obtain the inner green sheet 10a having the internal electrode pattern layer 12a.

Figure 5A:
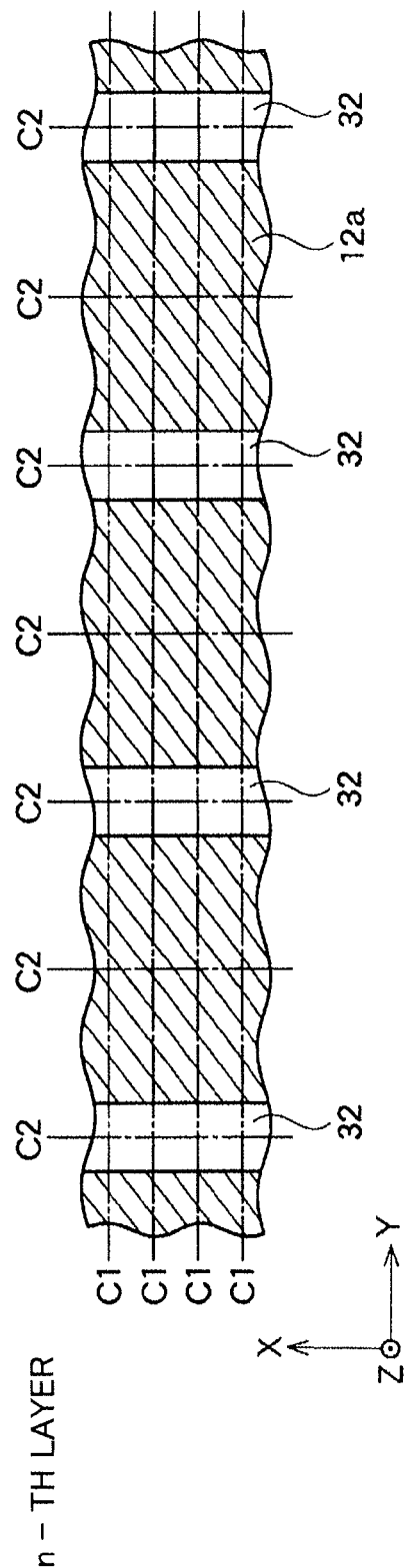
FIG. 5Aa is a plan view illustrating a portion of the n-th internal electrode pattern layer taken along the line V-V illustrated in FIG. 4.
Figure 5A:
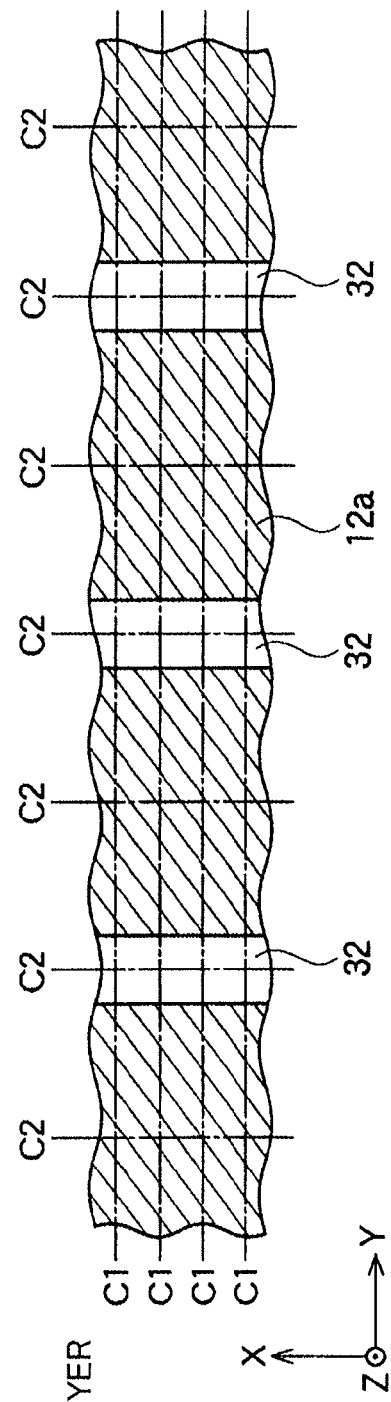

At this time, as illustrated in FIG. 5Aa, a gap 32 of the internal electrode pattern layer 12a is formed in the Y-axis direction and a continuous flat internal electrode pattern layer 12a is formed in the X-axis direction at the n-th layer.

Next, as illustrated in FIG. 5Ab, the gap 32 of the internal electrode pattern layer 12a is formed in the Y-axis direction and a continuous flat internal electrode pattern layer 12a is formed in the X-axis direction at the (n+1)-th layer as well. At this time, the gaps 32 of the internal electrode pattern layer of the n-th layer and the (n+1)-th layer are formed so as not to overlap each other in the Z axis direction of the laminating direction.

In this manner, the internal laminate 13a is manufactured by laminating a plurality of the inner green sheet 10a having the internal electrode pattern layer 12a, an appropriate number of the outer green sheets 11a is then formed above and below the internal laminate 13a by using the paste for outer green sheet, and the resultant is pressurized in the laminating direction to obtain a green laminate.

Figure 6A:
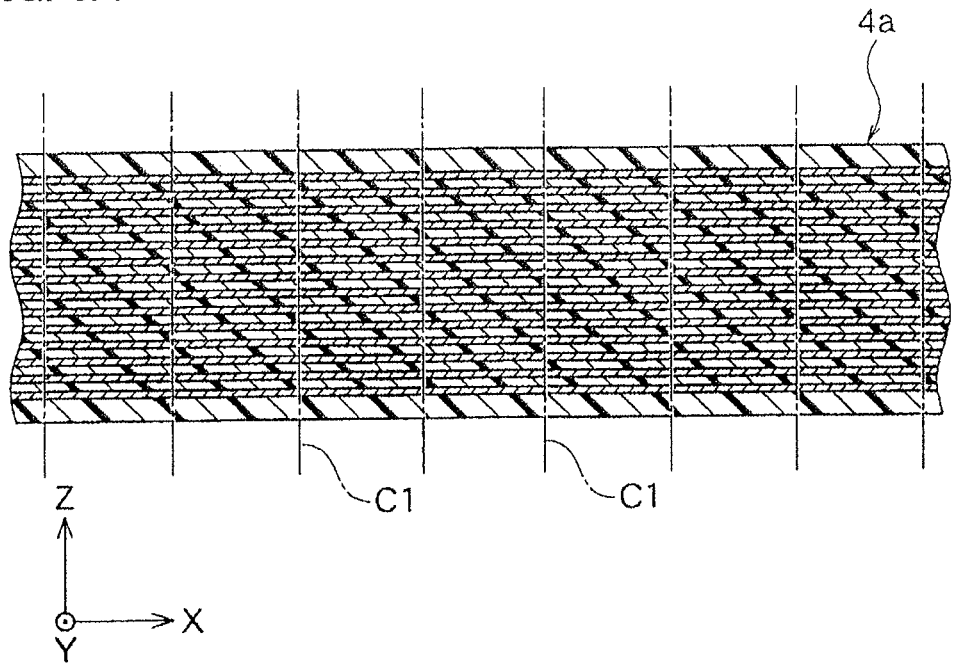
FIG. 6A is a schematic cross-sectional view of the laminate after lamination of the green sheet illustrated in FIG. 4 parallel to the X-Z-axis plane.
Figure 6B:
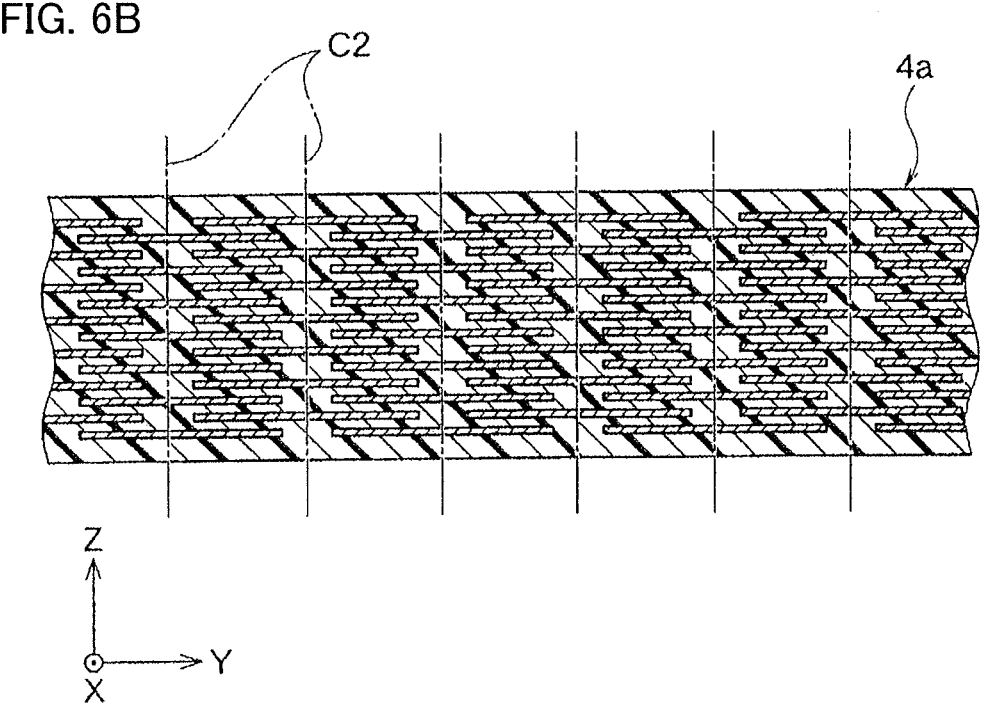
FIG. 6B is a schematic cross-sectional view of the laminate after the lamination of the green sheet illustrated in FIG. 4 parallel to the Y-Z-axis plane.

Next, the green laminate is cut along a cutting plane C1 and a cutting plane C2 in FIG. 5Aa, FIG. 5Ab, FIG. 6A, and FIG. 6B to obtain a green chip. C1 is a cutting plane parallel to the Y-Z axis plane, and C2 is a cutting plane parallel to the Z-X-axis plane.

As illustrated in FIG. 5Aa, the cutting plane C2 on the both sides of the cutting plane C2 to cut the internal electrode pattern layer 12a at the n-th layer cuts the gap 32 of the internal electrode pattern layer 12a. In addition, the cutting plane C2 which has cut the internal electrode pattern layer 12a at the n-th layer cuts the gap 32 of the internal electrode pattern layer 12a at the (n+1)-th layer.

By obtaining the green chip by such a cutting method, the n-th internal electrode pattern layer 12a of the green chip is configured to be exposed on one cutting plane and not to be exposed on the other cutting plane in the cutting plane C2 of the green chip. In addition, the (n+1)-th internal electrode pattern layer 12a of the green chip has a configuration in which the internal electrode pattern layer 12a is not exposed on the other cutting plane on which the internal electrode pattern layer 12a is exposed at the n-th layer and the internal electrode pattern layer 12a is exposed on one cutting plane on which the internal electrode pattern layer 12a is not exposed at the n-th layer on the cutting plane C2 of the green chip.

Furthermore, the internal electrode pattern layer 12a is configured to be exposed in all of the layers on the cutting plane C1 of the green chip.

In addition, the method for forming the internal electrode pattern layer 12a is not particularly limited, and it may be formed by a thin film forming method such as vapor deposition or sputtering other than a printing method and a transcription method.

In addition, a step absorbing layer 20 may be formed at the gap 32 of the internal electrode pattern layer 12a. The step on the surface of the green sheet 10a due to the internal electrode pattern layer 12a is eliminated by forming the step absorbing layer 20, and the step absorbing layer 20 finally contributes to the prevention of deformation of the ceramic sintered body 4 to be obtained.

The step absorbing layer 20 is formed by a printing method or the like in the same manner as the internal electrode pattern layer 12a, for example. The step absorbing layer 20 contains a ceramic powder and an organic vehicle which are the same as those in the green sheet 10a, but it is formed by a printing method unlike the green sheet 10a, and thus the ceramic powder and the organic vehicle are adjusted so as to be easily printed. Examples of the printing method may include screen printing and gravure printing.

The green chip is solidified by removing the plasticizer through solidification and drying. The green chip after the solidification and drying is introduced into the barrel container together with the media and the polishing liquid and subjected to barrel polishing by a horizontal centrifugal barrel machine or the like. The green chip after the barrel polishing is washed with water and dried. The green chip after drying is subjected to a binder removal step, a calcination step, and an annealing step to be conducted if necessary, whereby the element body 3 is obtained.

The binder removal step, the calcination step, and the annealing step may be conducted continuously or independently.

The both end surfaces in the Y-axis direction and the both end surfaces in the Z-axis direction of the element body 3 obtained as described above are polished, for example, by barrel polishing, sandblasting, or the like.

Next, paste for insulating layer is applied and baked on the both end surfaces in the X-axis direction of the element body 3 so as to form the insulating layer 16 and obtain the ceramic sintered body 4 illustrated in FIG. 1 and FIG. 2. This paste for insulating layer may be obtained, for example, by kneading the raw material for glass described above, a binder containing ethyl cellulose as the main component, and terpineol and acetone of the dispersion medium by a mixer.

The element body 3 is coated with the paste for insulating layer by any coating method, such as dipping, printing, coating, vapor deposition, and spraying.

The element body 3 to which the paste for insulating layer is applied is baked under any conditions, such as in an atmosphere of humidified $N_2$ or dry $N_2$, at 700° C. to 1300° C., retained for 0.1 hour to 3 hours.

Incidentally, the width in the X-axis direction of the reaction phase is affected by baking retention time of the element body 3, and the above-mentioned range of R/Wgap is obtained by having the above-mentioned baking retention time.

As illustrated in FIG. 3, the glass component that is liquefied at the time of baking easily penetrates into the gap (space of retraction distance "d") from the end portion of the inner dielectric layer 10 to the end portion of the internal electrode layer 12 by the capillary action. Accordingly, the gap is reliably filled with the insulating layer 16, and thus not only the insulating properties are enhanced but also the moisture resistance is favorable.

The both end surfaces in the Y-axis direction and the both end surfaces in the Z-axis direction of the ceramic sintered body 4 obtained as described above are polished, for example, by barrel polishing, sandblasting, or the like.

Next, the paste for external electrode is coated and calcinated on the both end surfaces in the Y-axis direction of the ceramic sintered body on which the insulating layer 16 is baked to form the external electrodes 6 and 8. The formation of the external electrodes 6 and 8 may be conducted before or after the formation of the insulating layer 16, or may be simultaneously conducted with the formation of the insulating layer 16.

The method for forming the external electrodes 6 and 8 is not particularly limited, and it is possible to use an appropriate method such as coating and baking of the paste for external electrode, plating, vapor deposition, or sputtering.

If necessary, a covering layer is formed on the surfaces of the external electrodes 6 and 8 by plating or so.

The multilayer ceramic capacitor 2 of the present embodiment thus manufactured is mounted on a printed circuit board by soldering or the like and used in various kinds of electronic devices.

In the prior art, a portion of the dielectric layer is adopted as a gap portion, and thus a blank pattern in which the internal electrode pattern layer is not formed is formed at the portion to be the gap portion after calcination of the surface of the green sheet at a predetermined interval along the X-axis direction.

In contrast, in the present embodiment, the internal electrode pattern layer is continuously formed along the X-axis direction, and the gap portion is obtained by forming an insulating layer on the element body. Hence, a blank pattern for forming the gap portion is not formed. Accordingly, a flat film of the internal electrode pattern layer is formed on the green sheet unlike the method of the prior art. Hence, the number of acquisition of the green chip per area of the green sheet can be increased as compared to the prior art.

In addition, in the present embodiment, the green laminate is cut without having to worry about the blank pattern unlike the prior art, and thus the yield of cutting is improved as compared to that in the prior art.

Furthermore, there is a problem in the prior art that the thickness of the blank pattern portion is thinner as compared to the portion at which the internal electrode pattern layer is formed when the green sheet is laminated and thus the green chip is curved in the vicinity of the cutting plane thereof when the green laminate is cut. In addition, in the prior art, a bump is formed near the blank pattern portion of the internal electrode pattern layer, and thus irregularities is caused on the internal electrode layer and it is concerned that the internal electrode or green sheet is deformed as these are laminated. In contrast, in the present embodiment, the blank pattern is not formed and the bump of the internal electrode pattern layer is also not formed.

Furthermore, in the present embodiment, the internal electrode pattern layer is a flat film, a bump of the internal electrode pattern layer is not formed, and bleeding or blurring of the internal electrode pattern layer is not caused in the vicinity of the gap portion, and thus it is possible to improve the acquisition capacity. This effect is more remarkable as the element body is smaller.

In the present embodiment, the insulating layer 16 is formed on the element body 3 by baking the paste for insulating layer on the element body 3 after being subjected to the calcination. By employing this manner, it is possible to improve the moisture resistance and to improve the durability to a change of the external environmental such as a thermal shock or a physical shock.

The embodiments of the present invention have been described, but the present invention is not limited to the embodiments described above in any way and may be variously modified within the scope of the present invention.

Figure 5B:
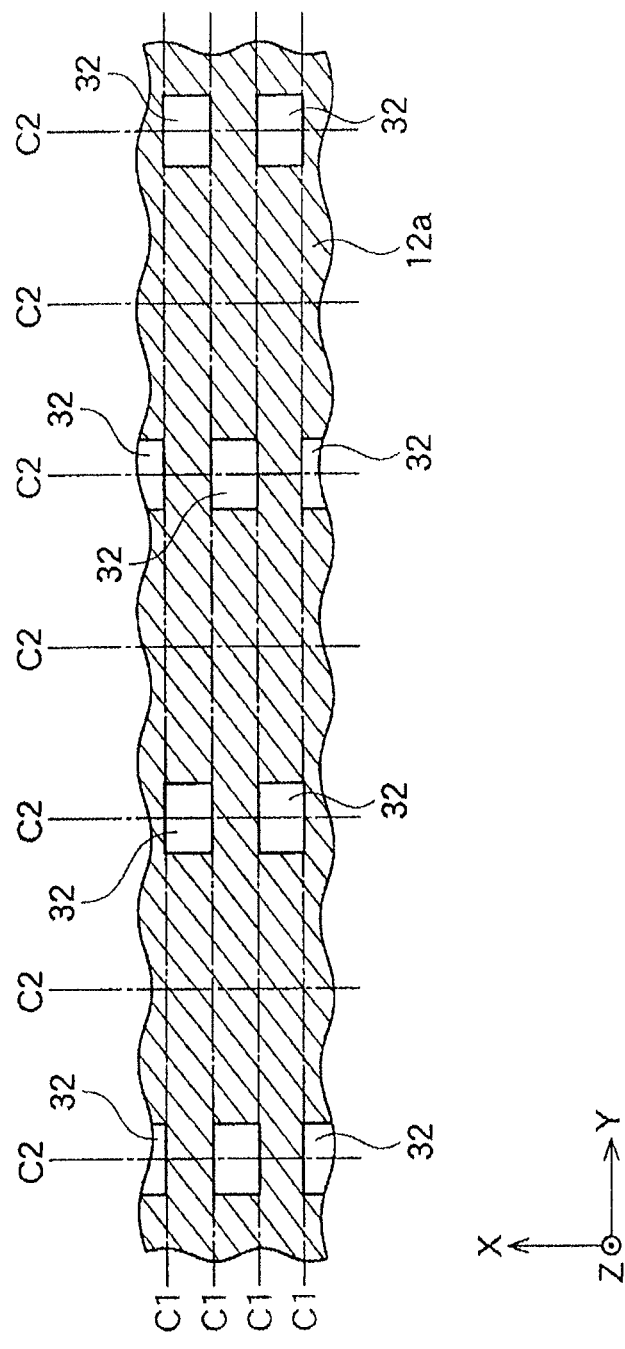
FIG. 5B is a plan view illustrating a portion of the internal electrode pattern layer taken along the line V-V illustrated in FIG. 4.

For example, in addition to the pattern illustrated in FIG. 5Aa and FIG. 5Ab, the internal electrode pattern layer 12a may be a pattern having the gap 32 of the grid-like internal electrode pattern layer 12a as illustrated in FIG. 5B. Although the coated portions 16a are formed in the above-mentioned embodiment as illustrated in FIG. 2, the insulating layers 16 may be configured to cover only both end surfaces in the X-axis direction of the element body 3 without forming the insulating layers 16.

In addition, the multilayer electronic component of the present invention is not limited to a multilayer ceramic capacitor, but it can be applied to other multilayer electronic components. Other multilayer electronic components are all of the electronic parts in which the dielectric layer is laminated via an internal electrode, and examples thereof may include a bandpass filter, an inductor, a laminated three-terminal filter, a piezoelectric element, a PTC thermistor, a NTC thermistor, and a varistor.

Examples

Hereinafter, the present invention will be described based on further detailed Examples, but the present invention is not limited to these Examples.

Sample No. 1 to Sample No. 32

First, a $BaTiO_3$ powder: 100 parts by mass was prepared as main component of dielectric material, and $SiO_2$: 0.5 parts by mass, $Y_2O_3$: 0.8 parts by mass, MgO: 0.5 by mass, and MnO: 1.0 parts by mass were prepared as accessory component, respectively.

Next, the 100 parts of $BaTiO_3$ powder and the raw material of accessory component prepared above were wet-pulverized for 15 hours and dried to obtain a raw material of the dielectric material (dielectric raw material).

Next, the obtained dielectric raw material: 100 parts by mass, a polyvinyl butyral resin: 10 parts by mass, dioctyl phthalate (DOP) as a plasticizer: 5 parts by mass, and an alcohol as a solvent: 100 parts by mass were mixed and pasted by a ball mill, thereby obtaining a paste for inner green sheet.

In addition, apart from to the above, Ni particles: 44.6 parts by mass, terpineol: 52 parts by mass, ethyl cellulose: 3 parts by mass, and benzotriazole: 0.4 parts by mass were kneaded and formed into to a slurry by a triple roll, thereby preparing a paste for internal electrode layer.

The inner green sheet 10a was formed on a PET film by using the paste for inner green sheet prepared in the above. Subsequently, the internal electrode pattern layer 12a was formed thereon by using the paste for internal electrode layer. Then, the inner green sheet 10a having the internal electrode pattern layer 12a was obtained.

As illustrated in FIG. 4, the internal laminate 13a was manufactured by laminating the inner green sheet 10a having the internal electrode pattern layer 12a, an appropriate number of the outer green sheets 11a was then formed above and below the internal laminate 13a by using the paste for outer green sheet, and the resultant was pressurized in the laminating direction, thereby obtaining a green laminate.

Next, the green laminate was cut along the cutting plane C1 and the cutting plane C2 to obtain a green chip as illustrated in FIG. 5Aa, FIG. 5Ab, FIG. 6A, and FIG. 6B.

Next, the green chip thus obtained was subjected to the binder removal treatment, the calcination, and the annealing under the following conditions, thereby obtaining the element body 3.

The condition for binder removal treatment was set so as to have a rate of temperature rise: 25° C./hour, a retention temperature: 235° C., a temperature retention time: 8 hours, and an atmosphere: in the air.

The condition for calcination was set so as to have a rate of temperature rise: 600 to 1000° C./hour, a retention temperature: from 1100° C. to 1150° C., a retention time: 1 hour, and a temperature dropping rate: 200° C./hour. Incidentally, the atmosphere gas was a humidified $N_2+H_2$ mixed gas, and an oxygen partial pressure was $10^{-12}$ MPa.

The condition for annealing was set so as to have a rate of temperature rise: 200° C./hour, a retention temperature: 1050° C., a temperature retention time: 3 hours, a temperature dropping rate: 200° C./hour, and an atmosphere gas: humidified $N_2$ gas (oxygen partial pressure: $10^{-7}$ MPa).

Incidentally, a wetter was used for the humidification of the atmosphere gas at the time of calcination and annealing.

Next, glass powder whose composition is shown in Table 1 or Table 2, binder containing ethyl cellulose as main component, and terpineol and acetone of the dispersion medium were kneaded by a mixer to prepare a paste for insulating layer. Incidentally, the values shown in Tables 1 and 2 represent mass %.

The paste for insulating layer was applied to the end surfaces in the X-axis direction of the element body 3, and retained and baked for 2 hours in dry $N_2$ atmosphere at 1000° C. so as to form the insulating layers 16 on the element body 3 and obtain the ceramic sintered body 4.

Next, the external electrodes 6 and 8 were formed to obtain the capacitor samples 2 (multilayer ceramic capacitor 2).

The capacitor samples 2 etc. obtained were evaluated by the following method.

<Thermal Expansion Coefficient>

A thermal expansion coefficient of the insulating layer 16 was measured. Specifically, the results are shown in Table 3 or 4. Incidentally, the thermal expansion coefficient of Ni constituting the internal electrode layers 12 was $128 \times 10^{-7}$/K, and the thermal expansion coefficient of the dielectric layers was $126 \times 10^{-7}$/K.

<Thermal Shock Resistance>

A heat treatment cycle composed of the following step (i) to step (iv) was performed to a substrate and a capacitor sample 2. The single heat treatment cycle is composed of the step (i) of retaining the substrate and the capacitor sample for 30 minutes under temperature condition where temperature of the capacitor sample was −55° C., the step (ii) of increasing the temperature of the capacitor sample to 125° C. within 10% time (3 minutes) of the above retention time, the step (iii) of retaining the temperature condition of the capacitor sample of 125° C. for 30 minutes, and the step (iv) of decreasing the temperature of the capacitor sample to −55° C. within 10% time (3 minutes) of the above retention time.

The single heat treatment cycle was repeated 3000 times to 100 capacitor samples, and a thermal shock resistance failure rate was obtained by classifying a capacitor sample whose electrostatic capacity C was decreased by 20% before/after the thermal shock resistance test into failure using a LCR meter. Then, whether there was a crack on the gap portion 17, the base portion (element body 3 portion), and the insulating layer 16 was judged through observation of the polished cross section by a stereomicroscope, and a crack incidence rate was respectively obtained. The results are shown in Tables 3 and 4.

<Presence of Reaction Phase>

A STEM-EDS analysis of Si element was conducted to an interface between the inner dielectric layers 10 and the insulating layer 16 of the ceramic sintered body 4 so as to obtain a mapping data of the Si element, and a place at which the Si element was present was acknowledged as the reaction phase 18. The result is shown in Table 3 and Table 4.

<Measurement of Depth "R" of Reaction Phase>

Since there may be a bump on the interface between the insulating layer and the reaction phases 18, a deepest depth based on the interface between the insulating layer and the reaction phases 18 was considered to be a depth R.

Specifically, a point (A1), which was a standard of the interface between the insulating layer and the reaction phases 18, was selected, and a tangent line of the interface between the insulating layer and the reaction phase 18 at the point (A1) was drawn. Then, a perpendicular line was drawn from the tangent line to the direction of the insulating layer 16, and a point (A2) crossed with the insulating layer 16 was obtained. The depth R of the reaction phases 18 was defined as a distance between the A1 and A2 obtained this way.

This operation was conducted to three capacitor samples and conducted to five layers per one capacitor sample. Then, an average of the depths R of the reaction phases 18 was obtained. The results are shown in Table 3 and Table 4.

<Presence of Ba—Ti—Si Phase>

The presence of the Ba—Ti—Si—O phase was confirmed by conducting quantitative analysis of each element contained in the respective reaction phases based on the STEM-EDS analysis with respect to the reaction phase 18 acknowledged by the above method. If one or more point having a composition ratio of $Ba_2TiSi_2O_8$ or $BaTiSiO_2$ is confirmed in the reaction phase, a fresnoite phase is considered to be formed. Incidentally, the quantitative analysis of each element at the STEM-EDS analysis includes various means, such as point analysis and surface analysis, but any method is selected as long as the composition showing $Ba_2TiSi_2O_8$ or $BaTiSiO_2$ can be confirmed. For example, with respect to a result of the quantitative analysis for a phase that can be confirmed to be the Ba—Ti—Si phase, it is understandable that $Ba_2TiSi_2O_8$ is formed if a molar ratio of Ba:Ti:Si=2:1:2 is substantially satisfied. If a result of the quantitative analysis shows that an atomic number ratio of each element is approximately Ba:Ti:Si=37:16:41, $Ba_2TiSi_2O_8$ may be determined. Incidentally, other elements, such as Ca, Al etc., may be contained. The results are shown in Table 3 and Table 4.

<Adhesion>

Figure 7:
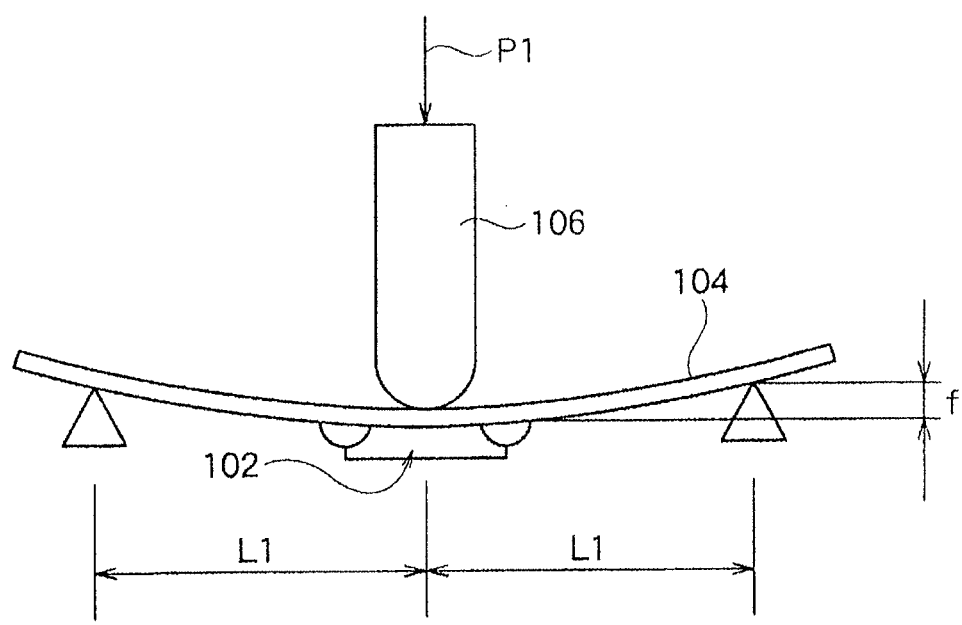
FIG. 7 is a schematic view showing a method for evaluating adhesion of the present Example.

Adhesion was evaluated by a deflection test. Specifically, as shown in FIG. 7, a fabricated capacitor sample 102 (multilayer ceramic capacitor 2) was mounted on a glass epoxy circuit board 104 by using solder (Sn 96.5%-Ag 3%-Cu 0.5%). Incidentally, "L1" in FIG. 7 was 45 mm.

Thereafter, with a deflection test machine, a deflection stress was added to the glass epoxy circuit board 104 from the direction of the arrow P1 toward below the mounting portion of the capacitor sample 102 by a pressurizing jig 106 until a deflection amount "f" becomes 15 mm. A substrate bending test was conducted in this way.

The deflection test was conducted in this way to observe its breakage mode and calculate a ratio of capacitor samples 102 having a mode where the element body 3 and the insulating layer 16 were peeled off. Incidentally, a peeling mode incidence rate after the deflection test was evaluated as follows. Less than 5%: ⊚; 5% to less than 10%: ○, and 10% or more: x. The results are shown in Table 3 and Table 4. Incidentally, the inner structure of the capacitor sample 102 according to the present embodiment was the same as that of the multilayer ceramic capacitor 2 shown in FIG. 1 and FIG. 2.

<Highly Accelerated Life Test (HALT)>

A failure time was defined as a duration from the beginning of application to a time where insulating resistance dropped by one order, while maintaining application conditions of voltage of 9.45 V and temperature of 140° C. with respect to the capacitor sample 2. In the present example, the above evaluation was performed to 20 capacitor samples, a mean time to failure (MTTF), which was its average value, was calculated. The results are shown in Table 3 and Table 4.

<Breakdown Voltage (BDV)>

A breakdown voltage was measured using an insulation resistance tester. With respect to the capacitor sample 2, a boosting rate of voltage was 10 V/sec at the temperature of 25° C., and a value of the breakdown voltage was a voltage value when a leakage current of 0.5 A or more began to flow or when the capacitor sample was broken. The results are shown in Table 3 and Table 4.

<Weight Change of Glass after Plating Resistance Test>

The paste for insulating layer was applied to the ceramic substrate constituting each capacitor sample 2 and baked. The glass surface area on the ceramic substrate was 1 cm². This glass substrate was immersed in a solution whose pH was 3 for 60 hours at room temperature. Then, a weight change of the ceramic substrate where the glass was baked before and after the immersion was calculated. The results are shown in Table 3 and Table 4. In the present embodiment, a favorable range of a weight reduction amount of the glass after the plating resistance test was less than 3 mg, and a more favorable range thereof was less than 1 mg.

Sample No. 33 and No. 34

Instead of the paste for insulating layer of sample No. 1 to sample No. 32, a paste for insulating layer containing polyester resin was used and applied to sample No. 33, and dried to form an insulating layer. Thereafter, since the polyester resin is decomposed after a forming step of a copper terminal, InGa metal was applied to an end surface of a sintered body so as to obtain a capacitor sample. An evaluation for sample No. 33 was performed in this way. Sample No. 34 was evaluated by obtaining a capacitor sample 2 in the same manner as sample No. 1 to sample No. 32, except that the paste for inner green sheet was used. The results are shown in Table.

TABLE 1

| Sample number | SiO$_2$ [mass %] | BaO [mass %] | Al$_2$O$_3$ [mass %] | Total of SiO$_2$, BaO, and Al$_2$O$_3$ in insulating layer [mass %] | Li$_2$O [mass %] | Na$_2$O [mass %] | K$_2$O [mass %] | CaO [mass %] | SrO [mass %] | B$_2$O$_3$ [mass %] | Total of glass component in insulating layer [mass %] |
|---|---|---|---|---|---|---|---|---|---|---|---|
| 1 | 35 | 55 | 5 | 95 | 2 | 2 | 1 | | | | 100 |
| 2 | 35 | 45 | 5 | 85 | 3 | 2 | | 5 | 5 | | 100 |
| 3 | 40 | 30 | 15 | 85 | 5 | 5 | | 5 | | | 100 |
| 4 | 40 | 40 | 10 | 90 | 3 | 7 | | | | | 100 |
| 5 | 45 | 20 | 10 | 75 | 5 | | 5 | 5 | 7 | 3 | 100 |
| 6 | 45 | 30 | 15 | 90 | | 5 | | 5 | | | 100 |
| 7 | 50 | 25 | 5 | 80 | | 5 | 2 | 13 | | | 100 |
| 8 | 50 | 30 | 10 | 90 | | 5 | | | 5 | | 100 |
| 9 | 60 | 20 | 5 | 85 | 2 | 4 | 6 | 3 | | | 100 |
| 10 | 60 | 20 | 5 | 85 | 4 | | | 5 | 5 | 1 | 100 |
| 11 | 70 | 20 | 5 | 95 | | 5 | | | | | 100 |
| 12 | 70 | 20 | 5 | 95 | | | | | 2 | 3 | 100 |
| 13 | 30 | 52 | 8 | 90 | 2 | | 8 | | | | 100 |
| 14 | 30 | 60 | 1 | 91 | | 4 | 5 | | | | 100 |
| 15 | 35 | 45 | 0 | 80 | 5 | 5 | | 5 | 5 | | 100 |

TABLE 2

| Sample number | SiO$_2$ [mass %] | BaO [mass %] | Al$_2$O$_3$ [mass %] | Sub-total of SiO$_2$, BaO, and Al$_2$O$_3$ in insulating layer [mass %] | Li$_2$O [mass %] | Na$_2$O [mass %] | K$_2$O [mass %] | CaO [mass %] | SrO [mass %] | B$_2$O$_3$ [mass %] | Total of glass component in insulating layer [mass %] |
|---|---|---|---|---|---|---|---|---|---|---|---|
| 16 | 80 | 0 | 0 | 80 | | | | 10 | 5 | 5 | 100 |
| 17 | 10 | 10 | 15 | 35 | | | | 20 | 20 | 25 | 100 |
| 18 | 5 | 12 | 4 | 21 | | 4 | 5 | 10 | 40 | 20 | 100 |
| 19 | 30 | 5 | 0 | 35 | 4 | 5 | 5 | 0 | 45 | 6 | 100 |
| 20 | 20 | 35 | 0 | 55 | | 5 | | 14 | 16 | 10 | 100 |
| 21 | 35 | 15 | 10 | 60 | 3 | 5 | 7 | 8 | 12 | 5 | 100 |
| 22 | 35 | 20 | 5 | 60 | 10 | 13 | 5 | | 7 | 5 | 100 |
| 23 | 40 | 20 | 5 | 65 | 1 | 5 | 5 | 8 | 4 | 12 | 100 |
| 24 | 80 | 10 | 10 | 100 | | | | | | | 100 |
| 25 | 20 | 50 | 0 | 70 | | 10 | 10 | 5 | 5 | | 100 |
| 26 | 20 | 15 | 5 | 40 | 5 | 20 | 20 | 5 | 5 | 5 | 100 |
| 27 | 20 | 50 | 0 | 70 | | 10 | 15 | 5 | 0 | | 100 |
| 28 | 10 | 20 | 5 | 35 | 5 | 20 | 20 | 5 | 5 | 10 | 100 |
| 29 | 80 | 10 | 10 | 100 | | | | | | | 100 |
| 30 | 75 | 10 | 15 | 100 | | | | | | | 100 |
| 31 | 20 | 15 | 5 | 40 | 5 | 20 | 20 | 5 | 5 | 5 | 100 |
| 32 | 0 | 20 | 10 | 30 | 5 | 10 | 5 | 10 | 15 | 25 | 100 |
| 33 | Polyester resin | | | | | | | | | | |
| 34 | BT (dielectric layer) | | | | | | | | | | |

TABLE 3

| Sample number | Thermal expansion coefficient of insulating layer (α) [×10$^{-7}$/K] | α/β | Failure rate after 3000 cyc thermal shock resistance [%] | Gap portion crack incidence rate [%] | Base portion crack incidence rate [%] | Presence of reaction phase | Adhesion (peeling mode ratio after deflection test) | Presence of Ba—Ti—Si—O phase | Depth R of reaction phase [μm] | Breakdown voltage [V/μm] | Crack incidence rate of insulating layer [%] | HALT reliability (MFFT) [h] | Weight change of glass after plating resistance test |
|---|---|---|---|---|---|---|---|---|---|---|---|---|---|
| 1 | 101 | 0.79 | 0 | 1 | 0 | ○ | ◎: 2% | Ba$_2$TiSi$_2$O$_8$ | 1.2 | 96 | 5 | 191000 | ◎ (−0.3 mg) |
| 2 | 97 | 0.76 | 0 | 0 | 0 | ○ | ◎: 2% | Ba$_2$TiSi$_2$O$_8$ | 1.1 | 90 | 8 | 203000 | ◎ (−0.5 mg) |
| 3 | 91 | 0.71 | 0 | 0 | 0 | ○ | ◎: 1% | Ba$_2$TiSi$_2$O$_8$ | 1.5 | 83 | 9 | 184000 | ◎ (−0.5 mg) |

TABLE 3-continued

| Sample number | Thermal expansion coefficient of insulating layer (α) [×10⁻⁷/K] | α/β | Failure rate after 3000 cyc thermal shock resistance [%] | Gap portion crack incidence rate [%] | Base portion crack incidence rate [%] | Presence of reaction phase | Adhesion (peeling mode ratio after deflection test) | Presence of Ba—Ti—Si—O phase | Depth R of reaction phase [μm] | Breakdown voltage [V/μm] | Crack incidence rate of insulating layer [%] | HALT reliability (MFFT) [h] | Weight change of glass after plating resistance test |
|---|---|---|---|---|---|---|---|---|---|---|---|---|---|
| 4 | 92 | 0.72 | 0 | 0 | 0 | ○ | ◎: 1% | Ba₂TiSi₂O₈ | 1.9 | 87 | 10 | 197000 | ◎ (−0.3 mg) |
| 5 | 81 | 0.63 | 0 | 0 | 0 | ○ | ◎: 2% | Ba₂TiSi₂O₈ | 1.7 | 91 | 12 | 201000 | ◎ (−0.2 mg) |
| 6 | 80 | 0.63 | 0 | 0 | 0 | ○ | ◎: 0% | Ba₂TiSi₂O₈ | 1.5 | 94 | 15 | 216000 | ◎ (−0.3 mg) |
| 7 | 64 | 0.50 | 0 | 0 | 0 | ○ | ◎: 1% | Ba₂TiSi₂O₈ | 2.2 | 101 | 13 | 223000 | ◎ (−0.2 mg) |
| 8 | 60 | 0.47 | 0 | 0 | 0 | ○ | ◎: 1% | Ba₂TiSi₂O₈ | 1.8 | 95 | 12 | 194000 | ◎ (−0.2 mg) |
| 9 | 59 | 0.46 | 0 | 0 | 0 | ○ | ◎: 0% | Ba₂TiSi₂O₈ | 2.6 | 89 | 17 | 239000 | ◎ (−0.4 mg) |
| 10 | 56 | 0.44 | 0 | 0 | 0 | ○ | ◎: 2% | Ba₂TiSi₂O₈ | 1.3 | 92 | 12 | 253000 | ◎ (−0.3 mg) |
| 11 | 49 | 0.38 | 0 | 0 | 0 | ○ | ◎: 0% | Ba₂TiSi₂O₈ | 0.5 | 95 | 11 | 202000 | ◎ (−0.5 mg) |
| 12 | 36 | 0.28 | 2 | 0 | 2 | ○ | ◎: 1% | Ba₂TiSi₂O₈ | 0.4 | 99 | 10 | 206000 | ◎ (−0.5 mg) |
| 13 | 110 | 0.86 | 2 | 2 | 0 | ○ | ◎: 2% | Ba₂TiSi₂O₈ | 0.3 | 97 | 9 | 214000 | ◎ (−0.4 mg) |
| 14 | 120 | 0.94 | 5 | 4 | 1 | ○ | ◎: 2% | Ba₂TiSi₂O₈ | 0.15 | 98 | 10 | 191000 | ◎ (−0.5 mg) |
| 15 | 98 | 0.77 | 0 | 1 | 0 | ○ | ◎: 2% | Ba₂TiSi₂O₈ | 0.9 | 93 | 11 | 195000 | ◎ (−0.4 mg) |

TABLE 4

| Sample number | Thermal expansion coefficient of insulating layer (α) [×10⁻⁷/K] | α/β | Failure rate after 3000 cyc thermal shock resistance [%] | Gap portion crack incidence rate [%] | Base portion crack incidence rate [%] | Presence of reaction phase | Adhesion (peeling mode ratio after deflection test) | Presence of Ba—Ti—Si—O phase | Depth R of reaction phase [μm] | Breakdown voltage [V/μm] | Crack incidence rate of insulating layer [%] | HALT reliability (MFFT) [h] | Weight change of glass after plating resistance test |
|---|---|---|---|---|---|---|---|---|---|---|---|---|---|
| 16 | 35 | 0.27 | 5 | 3 | 2 | X | ○: 9% | X | — | 67 | 43 | 113000 | ◎ (−0.2 mg) |
| 17 | 65 | 0.51 | 0 | 0 | 0 | X | ○: 7% | X | — | 69 | 40 | 91000 | ○ (−2.5 mg) |
| 18 | 76 | 0.59 | 0 | 0 | 0 | ○ | ◎: 1% | X | 8.9 | 48 | 34 | 60000 | ○ (−2.2 mg) |
| 19 | 89 | 0.70 | 0 | 0 | 0 | ○ | ◎: 2% | X | 10.5 | 54 | 43 | 52000 | ○ (−1.9 mg) |
| 20 | 73 | 0.57 | 0 | 0 | 0 | ○ | ◎: 2% | Ba₂TiSi₂O₈ | 5.4 | 79 | 15 | 184000 | ○ (−2.0 mg) |
| 21 | 55 | 0.43 | 0 | 1 | 0 | ○ | ◎: 1% | Ba₂TiSi₂O₈ | 5.3 | 84 | 21 | 193000 | ○ (−1.9 mg) |
| 22 | 103 | 0.80 | 0 | 0 | 0 | ○ | ◎: 1% | Ba₂TiSi₂O₈ | 6.0 | 89 | 22 | 182000 | ○ (−2.2 mg) |
| 23 | 64 | 0.50 | 0 | 0 | 0 | ○ | ◎: 1% | Ba₂TiSi₂O₈ | 4.3 | 79 | 23 | 195000 | ○ (−2.1 mg) |
| 24 | 30 | 0.23 | 17 | 12 | 11 | X | X: 14% | X | — | 45 | 45 | 67000 | ○ (−2.5 mg) |
| 25 | 140 | 1.09 | 35 | 25 | 0 | X | X: 15% | X | — | 43 | 41 | 43000 | ○ (−2.1 mg) |
| 26 | 198 | 1.55 | 65 | 45 | 0 | X | X: 18% | X | — | 39 | 34 | 32000 | X (−3.2 mg) |
| 27 | 178 | 1.39 | 32 | 26 | 0 | X | X: 15% | X | — | 40 | 54 | 45000 | X (−5.0 mg) |

TABLE 4-continued

| Sample number | Thermal expansion coefficient of insulating layer (α) [×10⁻⁷/K] | α/β | Failure rate after 3000 cyc thermal shock resistance [%] | Gap portion crack incidence rate [%] | Base portion crack incidence rate [%] | Presence of reaction phase | Adhesion (peeling mode ratio after deflection test) | Presence of Ba—Ti—Si—O phase | Depth R of reaction phase [μm] | Breakdown voltage [V/μm] | Crack incidence rate of insulating layer [%] | HALT reliability (MFFT) [h] | Weight change of glass after plating resistance test |
|---|---|---|---|---|---|---|---|---|---|---|---|---|---|
| 28 | 150 | 1.17 | 36 | 31 | 0 | X | X: 16% | X | — | 43 | 45 | 59000 | X (−4.6 mg) |
| 29 | 30 | 0.23 | 21 | 7 | 17 | ○ | ○: 5% | Ba₂TiSi₂O₈ | 0.02 | 64 | 23 | 112000 | ◎ (−0.8 mg) |
| 30 | 10 | 0.08 | 32 | 4 | 28 | ○ | ◎: 4% | Ba₂TiSi₂O₈ | 0.03 | 68 | 19 | 123000 | ◎ (−0.7 mg) |
| 31 | 170 | 1.33 | 41 | 37 | 0 | X | X: 14% | X | — | 45 | 48 | 45000 | X (−3.8 mg) |
| 32 | 145 | 1.13 | 33 | 22 | 0 | X | X: 18% | X | — | 40 | 51 | 23000 | X (−5.6 mg) |
| 33 | 840 | 6.56 | 55 | 78 | 2 | X | X: 16% | X | — | 43 | 34 | 21000 | X (−5.8 mg) |
| 34 | 126 | 0.98 | 32 | 28 | 0 | | | | | | | | |

With respect to sample No. 1 to sample No. 34, a thermal expansion coefficient of Ni constituting the internal electrode layer 12 was 128×10⁻⁷/K, and a thermal expansion coefficient of the dielectric layer was 126×10⁻⁷/K. Thus, β is 128×10⁻⁷/K, which is the thermal expansion coefficient of Ni constituting the internal electrode layer 12.

It was confirmed from sample No. 1 to No. 34 that the samples containing insulating layer composed of glass component and satisfying a relation of 0.23<α/β<1.09 (sample No. 1 to No. 23) showed significantly prevented failure rate after the thermal shock resistance test and crack incidence rate of insulating layer and base portion and high thermal shock resistance, compared with the samples failing to satisfy a relation of 0.23<α/β<1.09 (sample No. 24 to No. 33), the sample whose insulating layer was composed of resin (sample No. 33), or the sample whose insulating layer was composed of the same component as the dielectric layers (sample No. 34).

It was confirmed from sample No. 1 to No. 23 that the samples having the reaction phases (sample No. 1 to No. 15 and No. 18 to 23) showed a favorable adhesion, compared with the samples where no reaction phase was confirmed (sample No. 16 and No. 17).

Sample No. 35 to No. 66

A capacitor sample 2 was obtained and evaluated in the same manner as sample No. 1 to No. 32, except for using a paste for inner electrode layer obtained by kneading Cu particles: 44.6 parts by mass, terpineol: 52 parts by mass, ethyl cellulose: 3 parts by mass, and benzotriazole: 0.4 parts by mass by a triple roll and forming into to a slurry instead of the paste for inner electrode layer of sample No. 1 to No. 32. Incidentally, no crack incidence rate of the insulating layer 16 was measured for sample No. 35 to No. 66. The results are shown in Table 7 and Table 8.

Incidentally, a thermal expansion coefficient of Cu constituting the internal electrode layer 12 of sample No. 35 to No. 66 was 168×10⁻⁷/K. Thus, β is 168×10⁻⁷/K, which is the thermal expansion coefficient of Cu constituting the internal electrode layer 12.

Sample No. 67 and No. 68

A capacitor sample 2 was obtained and evaluated in the same manner as sample No. 35 to No. 66, except for using the paste for insulating layer used for sample No. 33 with respect to sample No. 67 and using the paste for inner green sheet with respect to sample No. 68 instead of using the paste for insulating layer of sample No. 35 to No. 66. The results are shown in Table 8.

TABLE 5

| Sample number | SiO₂ [mass %] | BaO [mass %] | Al₂O₃ [mass %] | Total of SiO₂, BaO, and Al₂O₃ in insulating layer [mass %] | Li₂O [mass %] | Na₂O [mass %] | K₂O [mass %] | CaO [mass %] | SrO [mass %] | B₂O₃ [mass %] | Total of glass component in insulating layer [mass %] |
|---|---|---|---|---|---|---|---|---|---|---|---|
| 35 | 35 | 55 | 5 | 95 | 2 | 2 | 1 | | | | 100 |
| 36 | 35 | 45 | 5 | 85 | 3 | 2 | | 5 | 5 | | 100 |
| 37 | 40 | 30 | 15 | 85 | 5 | 5 | | 5 | | | 100 |
| 38 | 40 | 40 | 10 | 90 | 3 | 7 | | | | | 100 |
| 39 | 45 | 20 | 10 | 75 | 5 | | 5 | 5 | 7 | 3 | 100 |
| 40 | 45 | 30 | 15 | 90 | | 5 | | 5 | | | 100 |
| 41 | 50 | 25 | 5 | 80 | | 5 | 2 | 13 | | | 100 |
| 42 | 50 | 30 | 10 | 90 | 5 | | | | 5 | | 100 |
| 43 | 60 | 20 | 5 | 85 | 2 | 4 | 6 | 3 | | | 100 |

TABLE 5-continued

| Sample number | SiO$_2$ [mass %] | BaO [mass %] | Al$_2$O$_3$ [mass %] | Total of SiO$_2$, BaO, and Al$_2$O$_3$ in insulating layer [mass %] | Li$_2$O [mass %] | Na$_2$O [mass %] | K$_2$O [mass %] | CaO [mass %] | SrO [mass %] | B$_2$O$_3$ [mass %] | Total of glass component in insulating layer [mass %] |
|---|---|---|---|---|---|---|---|---|---|---|---|
| 44 | 60 | 20 | 5 | 85 | 4 |   |   | 5 | 5 | 1 | 100 |
| 45 | 70 | 20 | 5 | 95 |   | 5 |   |   |   |   | 100 |
| 46 | 33 | 57 | 8 | 98 | 2 |   |   |   |   |   | 100 |
| 47 | 30 | 60 | 1 | 91 | 4 | 5 |   |   |   |   | 100 |
| 48 | 35 | 45 | 0 | 80 |   | 5 | 5 | 5 | 5 |   | 100 |

TABLE 6

| Sample number | SiO$_2$ [mass %] | BaO [mass %] | Al$_2$O$_3$ [mass %] | Total of SiO$_2$, BaO, and Al$_2$O$_3$ in insulating layer [mass %] | Li$_2$O [mass %] | Na$_2$O [mass %] | K$_2$O [mass %] | CaO [mass %] | SrO [mass %] | B$_2$O$_3$ [mass %] | Total of glass component in insulating layer [mass %] |
|---|---|---|---|---|---|---|---|---|---|---|---|
| 49 | 10 | 10 | 15 | 35 |   |   |   | 20 | 20 | 25 | 100 |
| 50 | 5 | 12 | 4 | 21 |   | 4 | 5 | 10 | 40 | 20 | 100 |
| 51 | 30 | 5 | 0 | 35 | 4 | 5 | 5 | 0 | 45 | 6 | 100 |
| 52 | 20 | 35 | 0 | 55 |   | 5 |   | 14 | 16 | 10 | 100 |
| 53 | 35 | 15 | 10 | 60 | 3 | 5 | 7 | 8 | 12 | 5 | 100 |
| 54 | 35 | 20 | 5 | 60 | 10 | 13 | 5 |   | 7 | 5 | 100 |
| 55 | 40 | 20 | 5 | 65 | 1 | 5 | 5 | 8 | 4 | 12 | 100 |
| 56 | 20 | 50 | 0 | 70 |   | 10 | 10 | 5 | 5 |   | 100 |
| 57 | 10 | 20 | 5 | 35 | 5 | 20 | 20 | 5 | 5 | 10 | 100 |
| 58 | 0 | 20 | 10 | 30 | 5 | 10 | 5 | 10 | 15 | 25 | 100 |
| 59 | 80 | 10 | 10 | 100 |   |   |   |   |   |   | 100 |
| 60 | 10 | 30 | 5 | 45 | 5 | 20 | 20 | 5 | 5 | 0 | 100 |
| 61 | 15 | 50 | 0 | 65 |   | 10 | 20 | 5 | 0 |   | 100 |
| 62 | 80 | 10 | 10 | 100 |   |   |   |   |   |   | 100 |
| 63 | 75 | 10 | 15 | 100 |   |   |   |   |   |   | 100 |
| 64 | 20 | 15 | 5 | 40 | 5 | 20 | 20 | 5 | 5 | 5 | 100 |
| 65 | 80 | 0 | 0 | 80 |   |   |   | 10 | 5 | 5 | 100 |
| 66 | 70 | 20 | 5 | 95 |   |   |   |   | 2 | 3 | 100 |
| 67 |   |   |   | Resin (polyester) |   |   |   |   |   |   |   |
| 68 |   |   |   | BT (dielectric layer) |   |   |   |   |   |   |   |

TABLE 7

| Sample number | Thermal expansion coefficient of insulating layer (α) [×10$^{-7}$/K] | α/β | Failure rate after 3000 cyc thermal shock resistance [%] | Gap portion crack incidence rate [%] | Base portion crack incidence rate [%] | Presence of reaction phase | Adhesion (peeling mode ratio after deflection test) | Presence of Ba—Ti—Si—O phase | Depth R of reaction phase [μm] | Breakdown voltage [V/μm] | HALT reliability (MFFT) [h] | Weight change of glass after plating resistance test |
|---|---|---|---|---|---|---|---|---|---|---|---|---|
| 35 | 101 | 0.60 | 0 | 1 | 0 | ○ | ◎: 1% | Ba$_2$TiSi$_2$O$_8$ | 1.2 | 96 | 156000 | ◎(−0.8 mg) |
| 36 | 97 | 0.58 | 0 | 0 | 0 | ○ | ◎: 1% | Ba$_2$TiSi$_2$O$_8$ | 1.1 | 90 | 157000 | ◎(−0.8 mg) |
| 37 | 91 | 0.54 | 0 | 0 | 0 | ○ | ◎: 0% | Ba$_2$TiSi$_2$O$_8$ | 1.5 | 87 | 147000 | ◎(−0.8 mg) |
| 38 | 92 | 0.55 | 0 | 0 | 0 | ○ | ◎: 0% | Ba$_2$TiSi$_2$O$_8$ | 1.9 | 87 | 132000 | ◎(−0.5 mg) |
| 39 | 81 | 0.48 | 0 | 0 | 0 | ○ | ◎: 1% | Ba$_2$TiSi$_2$O$_8$ | 1.7 | 91 | 141000 | ◎(−0.4 mg) |
| 40 | 80 | 0.48 | 0 | 1 | 0 | ○ | ◎: 0% | Ba$_2$TiSi$_2$O$_8$ | 1.5 | 94 | 126000 | ◎(−0.5 mg) |
| 41 | 64 | 0.38 | 0 | 0 | 0 | ○ | ◎: 0% | Ba$_2$TiSi$_2$O$_8$ | 2.2 | 101 | 167000 | ◎(−0.4 mg) |
| 42 | 60 | 0.36 | 0 | 2 | 0 | ○ | ◎: 0% | Ba$_2$TiSi$_2$O$_8$ | 1.8 | 95 | 198000 | ◎(−0.4 mg) |
| 43 | 59 | 0.35 | 0 | 2 | 0 | ○ | ◎: 0% | Ba$_2$TiSi$_2$O$_8$ | 2.6 | 89 | 201000 | ◎(−0.5 mg) |
| 44 | 56 | 0.33 | 1 | 1 | 0 | ○ | ◎: 1% | Ba$_2$TiSi$_2$O$_8$ | 1.3 | 92 | 218000 | ◎(−0.5 mg) |
| 45 | 49 | 0.29 | 3 | 2 | 2 | ○ | ◎: 0% | Ba$_2$TiSi$_2$O$_8$ | 0.5 | 95 | 192000 | ◎(−0.7 mg) |
| 46 | 105 | 0.63 | 0 | 2 | 0 | ○ | ◎: 1% | Ba$_2$TiSi$_2$O$_8$ | 0.4 | 97 | 176000 | ◎(−0.7 mg) |
| 47 | 120 | 0.71 | 0 | 1 | 1 | ○ | ◎: 1% | Ba$_2$TiSi$_2$O$_8$ | 0.2 | 98 | 161000 | ◎(−0.8 mg) |
| 48 | 98 | 0.58 | 0 | 1 | 1 | ○ | ◎: 1% | Ba$_2$TiSi$_2$O$_8$ | 0.4 | 93 | 195000 | ◎(−0.7 mg) |

TABLE 8

| Sample number | Thermal expansion coefficient of insulating layer (α) [×10⁻⁷/K] | α/β | Failure rate after 3000 cyc thermal shock resistance [%] | Gap portion crack incidence rate [%] | Base portion crack incidence rate [%] | Presence of reaction phase | Adhesion (peeling mode ratio after deflection test) | Presence of Ba—Ti—Si—O phase | Depth R of reaction phase [μm] | Breakdown voltage [V/μm] | HALT reliability (MFFT) [h] | Weight change of glass after plating resistance test |
|---|---|---|---|---|---|---|---|---|---|---|---|---|
| 49 | 65 | 0.39 | 1 | 1 | 1 | X | X: 12% | X | — | 43 | 94000 | ○(−2.5 mg) |
| 50 | 76 | 0.45 | 0 | 0 | 0 | ○ | ◎: 1% | X | 7.3 | 64 | 76000 | ○(−2.2 mg) |
| 51 | 89 | 0.53 | 0 | 0 | 0 | ○ | ◎: 1% | X | 10.2 | 61 | 65000 | ○(−1.9 mg) |
| 52 | 73 | 0.43 | 0 | 1 | 0 | ○ | ◎: 1% | Ba₂TiSi₂O₈ | 5.2 | 69 | 122000 | ○(−2.0 mg) |
| 53 | 55 | 0.33 | 2 | 1 | 0 | ○ | ◎: 1% | Ba₂TiSi₂O₈ | 5.3 | 75 | 111000 | ○(−1.9 mg) |
| 54 | 103 | 0.61 | 0 | 2 | 0 | ○ | ◎: 1% | Ba₂TiSi₂O₈ | 6.0 | 70 | 135000 | ○(−2.2 mg) |
| 55 | 64 | 0.38 | 0 | 1 | 0 | ○ | ◎: 1% | Ba₂TiSi₂O₈ | 4.5 | 89 | 143000 | ○(−2.1 mg) |
| 56 | 140 | 0.83 | 5 | 1 | 0 | X | ○: 9% | X | — | 43 | 21000 | ○(−2.1 mg) |
| 57 | 150 | 0.89 | 4 | 2 | 0 | X | ○: 8% | X | — | 43 | 50000 | X(−4.6 mg) |
| 58 | 145 | 0.86 | 3 | 1 | 2 | X | ○: 9% | X | — | 40 | 23000 | X(−5.6 mg) |
| 59 | 30 | 0.18 | 25 | 12 | 11 | X | X: 12% | X | — | 45 | 64000 | ○(−2.5 mg) |
| 60 | 198 | 1.18 | 35 | 25 | 0 | X | X: 17% | X | — | 39 | 30000 | X(−3.2 mg) |
| 61 | 178 | 1.06 | 22 | 27 | 0 | X | X: 15% | X | — | 40 | 45000 | X(−5.0 mg) |
| 62 | 30 | 0.18 | 23 | 7 | 11 | ○ | ◎: 4% | Ba₂TiSi₂O₈ | 0.03 | 67 | 123000 | ◎(−0.8 mg) |
| 63 | 10 | 0.06 | 54 | 4 | 16 | ○ | ○: 5% | Ba₂TiSi₂O₈ | 0.04 | 75 | 112000 | ◎(−0.7 mg) |
| 64 | 170 | 1.01 | 19 | 19 | 1 | X | X: 16% | X | — | 45 | 45000 | X(−3.8 mg) |
| 65 | 35 | 0.21 | 21 | 2 | 8 | X | X: 19% | X | — | 45 | 106000 | ◎(−0.7 mg) |
| 66 | 36 | 0.21 | 22 | 3 | 6 | ○ | ◎: 0% | Ba₂TiSi₂O₈ | 0.5 | 99 | 180000 | ◎(−0.8 mg) |
| 67 | 840 | 5.00 | 52 | 65 | 0 | X | X: 12% | X | — | 39 | 21000 | X(−5.8mg) |
| 68 | 126 | 0.75 | 8 | 4 | 3 | | | | | | | |

It was confirmed from sample No. 35 to No. 68 that the samples containing insulating layer composed of glass component and satisfying a relation of $0.21<\alpha/\beta<1.01$ (sample No. 35 to No. 58) showed favorable thermal shock resistance, gap portion crack incidence rate, and base portion crack incidence rate, compared with the sample whose insulating layer was composed of dielectric material (sample No. 68), the samples whose α/β was 0.21 or less (sample No. 59, No. 62, No. 63, No. 65, and No. 66), the samples whose α/β was 1.01 or more (sample No. 60, No. 61, No. 64, No. 67, and No. 68), the sample whose insulating layer was composed of resin (sample No. 67), or the sample whose insulating layer was composed of the same component as the dielectric layers (sample No. 68).

Also, it was confirmed from sample No. 35 to No. 58 that the samples having reaction phases (sample No. 35 to No. 48 and No. 50 to No. 55) showed favorable thermal shock resistance and adhesion, compared with the samples where no reaction phase was confirmed (sample No. 49 and No. 56 to No. 58).

Furthermore, it was confirmed from sample No. 35 to No. 48 and No. 50 to No. 55 that the samples having Ba—Ti—Si—O phase (sample No. 35 to No. 48 and No. 52 to No. 55) showed favorable breakdown voltage and HALT reliability, compared with the samples where no Ba—Ti—Si—O phase was confirmed (sample No. 49 to No. 51).

Sample No. 70 to No. 74

A capacitor sample 2 was obtained and evaluated in the same manner as sample No. 1 to No. 32, except for using a paste for inner electrode layer obtained by kneading Pt particles: 44.6 parts by mass, terpineol: 52 parts by mass, ethyl cellulose: 3 parts by mass, and benzotriazole: 0.4 parts by mass by a triple roll and forming into to a slurry instead of the paste for inner electrode layer of sample No. 1 to No. 32. The results are shown in Table 10.

Incidentally, a thermal expansion coefficient of Pt constituting the internal electrode layer 12 of sample No. 70 to No. 74 was $89\times10^{-7}$/K. Thus, β is $126\times10^{-7}$/K, which is the thermal expansion coefficient of the dielectric layers.

TABLE 9

| Sample number | SiO₂ [mass %] | BaO [mass %] | Al₂O₃ [mass %] | Sub-total of SiO₂, BaO, and Al₂O₃ in insulating layer [mass %] | Li₂O [mass %] | Na₂O [mass %] | K₂O [mass %] | CaO [mass %] | SrO [mass %] | B₂O₃ [mass %] | Total of glass component in insulating layer [mass %] |
|---|---|---|---|---|---|---|---|---|---|---|---|
| 70 | 35 | 55 | 5 | 95 | 2 | 2 | 1 | | | | 100 |
| 71 | 50 | 25 | 5 | 80 | | 5 | 2 | 13 | | | 100 |
| 72 | 70 | 20 | 5 | 95 | 5 | | | | | | 100 |
| 73 | 20 | 50 | 0 | 70 | 10 | 15 | 5 | 0 | | | 100 |
| 74 | 75 | 10 | 15 | 100 | | | | | | | 100 |

TABLE 10

| Sample number | Thermal expansion coefficient of insulating layer (α) [×10⁻⁷/K] | α/β | Failure rate after 3000 cyc thermal shock resistance [%] | Gap portion crack incidence rate [%] | Base portion crack incidence rate [%] | Presence of reaction phase | Adhesion (peeling mode ratio after deflection test) | Presence of Ba—Ti—Si—O phase | Depth R of reaction phase [μm] | Breakdown voltage [V/μm] | Crack incidence rate of insulating layer [%] | HALT reliability (MFFT) [h] | Weight change of glass after plating resistance test |
|---|---|---|---|---|---|---|---|---|---|---|---|---|---|
| 70 | 101 | 0.80 | 0 | 1 | 0 | ◯ | ◎: 1% | Ba₂TiSi₂O₈ | 0.5 | 96 | 5 | 197000 | ◎(−0.3 mg) |
| 71 | 64 | 0.51 | 0 | 0 | 0 | ◯ | ◎: 0% | Ba₂TiSi₂O₈ | 1.2 | 101 | 13 | 223000 | ◎(−0.2 mg) |
| 72 | 49 | 0.39 | 0 | 0 | 0 | ◯ | ◎: 0% | Ba₂TiSi₂O₈ | 0.3 | 95 | 11 | 205000 | ◎(−0.5 mg) |
| 73 | 178 | 1.41 | 29 | 24 | 6 | X | X: 16% | X | — | 40 | 54 | 41000 | X(−5.0 mg) |
| 74 | 10 | 0.08 | 31 | 11 | 25 | ◯ | ◎: 4% | Ba₂TiSi₂O₈ | 0.04 | 78 | 19 | 34000 | ◎(−0.7 mg) |

It was confirmed from sample No. 70 to No. 74 that the samples satisfying a relation of 0.08<α/β<1.41 (sample No. 70 to No. 73) showed favorable thermal shock resistance, gap portion crack incidence rate, base portion crack incidence rate, breakdown voltage, insulating layer crack incidence rate, HALT reliability, and weight change of glass after plating resistance test, compared with the sample whose α/β was 1.41 (sample No. 73) or the sample whose α/β was 0.08 (sample No. 74).

EXPLANATIONS OF LETTERS OR NUMERALS 2, 102 . . . multilayer ceramic capacitor
3 . . . element body
4 . . . ceramic sintered body
6 . . . first external electrode
8 . . . second external electrode
10 . . . inner dielectric layer
10a . . . inner green sheet
11 . . . exterior region
11a . . . outer green sheet
12 . . . internal electrode layer
12A, 12B . . . lead portion
12a . . . internal electrode pattern layer
13 . . . interior region
13a . . . internal laminate
14 . . . capacity region
15A, 15B . . . lead region
16 . . . insulating layer
16a . . . coated portion
18 . . . reaction phase
20 . . . step absorbing layer
32 . . . gap between internal electrode pattern layers
104 . . . circuit board
106 . . . pressurizing jig

The invention claimed is:

1. A multilayer electronic component comprising a ceramic sintered body having an element body, the element body having an internal electrode layer and a dielectric layer, both of which are substantially parallel to a plane including a first axis and a second axis and are alternately laminated along a third axis direction, wherein
a pair of side surfaces facing each other in the first axis direction of the element body is respectively equipped with an insulating layer,
a pair of end surfaces facing each other in the second axis direction of the element body is respectively equipped with an external electrode electrically connected to the internal electrode layer,
the insulating layer comprises a glass component, and
a formula (1) of 0.35<α/β<0.9 is satisfied, where
α denotes a thermal expansion coefficient of the insulating layer and
β denotes a thermal expansion coefficient of one of the internal electrode layer and the dielectric layer that is larger than a thermal expansion coefficient of the other layer.

2. The multilayer electronic component according to claim 1, wherein
a reaction phase where at least one of constituents of the insulating layer is diffused in the dielectric layer is formed at an interface between the dielectric layer and the insulating layer, and
an average depth R of the reaction phase is 0.01 to 10 μm.

3. The multilayer electronic component according to claim 2, wherein
the reaction phase is a Ba—Ti—Si—O phase, and
the Ba—Ti—Si—O phase occupies 40% to 100% of a surface area of the dielectric layers on the side surface of the ceramic sintered body.

4. The multilayer electronic component according to claim 1, wherein
the glass component constituting the insulating layer contains:
$SiO_2$ of 30 to 70 mass %;
$BaO$ of 20 to 60 mass %; and
$Al_2O_3$ of 1 to 15 mass %, and
the glass component constituting the insulating layer contains $SiO_2$, $BaO$, and $Al_2O_3$ of 70 to 100 mass % in total.

5. The multilayer electronic component according to claim 2, wherein
the glass component constituting the insulating layer contains:
$SiO_2$ of 30 to 70 mass %;
$BaO$ of 20 to 60 mass %; and
$Al_2O_3$ of 1 to 15 mass %, and
the glass component constituting the insulating layer contains $SiO_2$, $BaO$, and $Al_2O_3$ of 70 to 100 mass % in total.

6. The multilayer electronic component according to claim 3, wherein
the glass component constituting the insulating layer contains:
$SiO_2$ of 30 to 70 mass %;
$BaO$ of 20 to 60 mass %; and
$Al_2O_3$ of 1 to 15 mass %, and the glass component constituting the insulating layer contains $SiO_2$, BaO, and $Al_2O_3$ of 70 to 100 mass % in total.

7. The multilayer electronic component according to claim 4, wherein the glass component constituting the insulating layer further contains:

alkali metal of 0.1 to 15 mass %;

CaO of 0 to 15 mass %;

SrO of 0 to 20 mass %; and $B_2O_3$ of 0 to 10 mass %.

8. The multilayer electronic component according to claim 5, wherein the glass component constituting the insulating layer further contains:

alkali metal of 0.1 to 15 mass %;

CaO of 0 to 15 mass %;

SrO of 0 to 20 mass %; and $B_2O_3$ of 0 to 10 mass %.

9. The multilayer electronic component according to claim 6, wherein the glass component constituting the insulating layer further contains:

alkali metal of 0.1 to 15 mass %;

CaO of 0 to 15 mass %;

SrO of 0 to 20 mass %; and $B_2O_3$ of 0 to 10 mass %.

10. The multilayer electronic component according to claim 1, wherein $0.35 < \alpha/\beta < 0.8$.

11. The multilayer electronic component according to claim 2, wherein the average depth R of the reaction phase is 0.05 to 5 μm.

12. The multilayer electronic component according to claim 3, wherein the Ba—Ti—Si—O phase is $Ba_2TiSi_2O_8$.

* * * * *